(12) United States Patent
Sharma et al.

(10) Patent No.: US 10,144,827 B2
(45) Date of Patent: *Dec. 4, 2018

(54) WEATHERABLE THERMOPLASTIC COMPOSITIONS, METHOD OF MANUFACTURE, AND ARTICLES THEREFROM

(71) Applicant: SABIC Global Technologies B.V., Bergen op Zoom (NL)

(72) Inventors: Yogesh Omprakash Sharma, Maharashtra (IN); Samik Gupta, Bangalore (IN); Paul Dean Sybert, Evansville, IN (US); Olga I. Kuvshinnikova, Glenmont, NY (US); Balakrishnan Parthipan, Bangalore (IN)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/528,988

(22) PCT Filed: Nov. 20, 2015

(86) PCT No.: PCT/US2015/061760
§ 371 (c)(1),
(2) Date: May 23, 2017

(87) PCT Pub. No.: WO2016/085790
PCT Pub. Date: Jun. 2, 2016

(65) Prior Publication Data
US 2017/0306147 A1    Oct. 26, 2017

Related U.S. Application Data

(60) Provisional application No. 62/084,155, filed on Nov. 25, 2014.

(51) Int. Cl.
C08L 69/00    (2006.01)
C08K 5/3432   (2006.01)
C08L 67/02    (2006.01)

(52) U.S. Cl.
CPC .......... C08L 69/005 (2013.01); C08K 5/3432 (2013.01); C08L 67/02 (2013.01); C08L 69/00 (2013.01)

(58) Field of Classification Search
CPC ...... C08L 69/005; C08L 67/02; C08K 5/3432
See application file for complete search history.

(56) References Cited

U.S. PATENT DOCUMENTS

| 641,620 | A | 1/1900 | Aster |
|---|---|---|---|
| 3,972,902 | A | 8/1976 | Heath et al. |
| 4,455,410 | A | 6/1984 | Giles, Jr. |
| 4,493,915 | A | 1/1985 | Lohmeijer |
| 4,600,647 | A | 7/1986 | Robeson et al. |
| 4,959,449 | A | 9/1990 | Stautzenberger et al. |
| 5,478,878 | A | 12/1995 | Nagaoka et al. |
| 6,228,910 | B1 | 5/2001 | Shakhnovich |
| 6,410,620 | B2 | 6/2002 | Shakhnovich |
| 6,414,058 | B2 | 7/2002 | Shakhnovich |
| 6,583,256 | B2 | 6/2003 | Vollenberg et al. |
| 6,607,814 | B2 | 8/2003 | Pickett et al. |
| 6,775,059 | B2 | 8/2004 | Kuwabara |
| 7,655,085 | B2 | 2/2010 | Shankarling et al. |
| 7,695,815 | B2 | 4/2010 | Argawal et al. |
| 7,709,581 | B2 | 5/2010 | Glasgow et al. |
| 7,790,292 | B2 | 9/2010 | Colborn et al. |
| 8,545,988 | B2 | 10/2013 | Yamaguchi et al. |
| 8,969,447 | B2 | 3/2015 | Van Der Mee et al. |
| 9,352,755 | B2 | 5/2016 | Van Der Mee et al. |
| 2005/0260369 | A1 | 11/2005 | Graf et al. |
| 2006/0264582 | A1 | 11/2006 | Mullen et al. |
| 2007/0027271 | A1 | 2/2007 | Davis et al. |
| 2007/0149629 | A1 | 6/2007 | Donovan et al. |

(Continued)

FOREIGN PATENT DOCUMENTS

| EP | 0303988 A2 | 2/1989 |
|---|---|---|
| EP | 0524731 A1 | 1/1993 |

(Continued)

OTHER PUBLICATIONS

International Search Report for International Application No. PCT/US2014/039982; International Filing Date May 29, 2014; dated Oct. 1, 2014; 4 pages.
International Search Report for International Application No. PCT/US2015/061760; International Filing Date Nov. 20, 2015; dated Feb. 29, 2016; 5 pages.
International Search Report for International Application No. PCT/US2015/062322; International Filing Dated Nov. 24, 2015; dated Feb. 22, 2016; 7 pages.
Manukian et al., "Chinophthalone," Chimia, Schweizerische Chemische Gesellschaft, CH, vol. 24, No. 9, Sep. 1, 1970; pp. 328-339.

(Continued)

Primary Examiner — Robert S Jones
(74) Attorney, Agent, or Firm — Cantor Colburn LLP

(57) ABSTRACT

A thermoplastic composition including a polyaryl ester, a polymer different from the polyaryl ester, and a phthalone compound according to the formula (I) wherein $Z_1$ represents the atoms necessary to complete a 9- to 13-membered single or fused aromatic ring structure, $Z_2$ represents the atoms necessary to complete a pyridine or quinoline ring, each $R_1$ and each $R_2$ are independently halogen, an alkyl group, an aryl group, a heterocyclic group, an alkoxy group, an aryloxy group, an aromatic or aliphatic thioether group, an aromatic or aliphatic carboxylic acid ester group, or an aromatic or aliphatic amide group, a is 0 to 6, b is 0 to 4, n is 1 or 2, and X is present only if n=2 and is a single bond or a divalent organic radical bonded to the $Z_1$ ring structure through an ether, ketone, or thio linkage.

18 Claims, 12 Drawing Sheets

(56) References Cited

U.S. PATENT DOCUMENTS

| | | |
|---|---|---|
| 2007/0155913 A1 | 7/2007 | Chakravarti et al. |
| 2008/0269386 A1 | 10/2008 | Chakravarti et al. |
| 2012/0208110 A1 | 8/2012 | Burns et al. |
| 2013/0224462 A1 | 8/2013 | Van Der Mee et al. |
| 2014/0295363 A1 | 10/2014 | Sun et al. |
| 2014/0326163 A1 | 11/2014 | Van Der Mee et al. |
| 2014/0329940 A1 | 11/2014 | Van Der Mee et al. |
| 2014/0357768 A1 | 12/2014 | Sharma et al. |
| 2014/0370213 A1 | 12/2014 | Van Der Mee et al. |
| 2017/0283612 A1 | 10/2017 | Sybert et al. |

FOREIGN PATENT DOCUMENTS

| | | |
|---|---|---|
| EP | 0653461 A2 | 5/1995 |
| EP | 0872526 A1 | 10/1998 |
| GB | 870680 | 6/1961 |
| JP | 3121626 B2 | 1/2001 |
| JP | 2003082201 A1 | 3/2003 |
| JP | 2004345276 A | 12/2004 |
| JP | 2006182980 A | 7/2006 |
| JP | 2012227359 A | 11/2012 |
| WO | 0015718 A1 | 3/2000 |
| WO | 0119921 A1 | 3/2001 |
| WO | 2013175448 A1 | 11/2013 |
| WO | 2014072923 A1 | 5/2014 |
| WO | 2015106204 A1 | 7/2015 |
| WO | 2015153483 A1 | 10/2015 |
| WO | 2016085790 A1 | 6/2016 |
| WO | 2016085928 A1 | 6/2016 |

OTHER PUBLICATIONS

Natarajan, Arunkumar, et al., "Pyrophthalones as Blue Wavelength Absorbers in Thermoplastic Media", Photochemistry and Photobiology, 2011, The American Society of Photobiology 0031-8655/11, pp. 1-7.

Neiland et al.; "Phthalones and Their Structural Analogs (Review)"; Chemistry of Heterocyclic Componds; Apr. 1, 1975; pp. 381-395.

Non Final Office Action in U.S. Appl. No. 13/904,642, filed May 29, 2013; dated Jul. 6, 2015; pp. 16.

Written Opinion for International Application No. PCT/US2014/039982; International Filing Date May 29, 2014; dated Oct. 1, 2014; 5 pages.

Written Opinion of the International Search Report for International Application No. PCT/US2015/061760; International Filing Date Nov. 20, 2015; dated Feb. 29, 2016; 5 pages.

Written Opinion of the International Search Report for International Application No. PCT/US2015/062322; International Filing Date Nov. 24, 2015; dated Feb. 22, 2016; 10 pages.

WEATHERABLE THERMOPLASTIC COMPOSITIONS, METHOD OF MANUFACTURE, AND ARTICLES THEREFROM

CROSS-REFERENCE TO RELATED APPLICATIONS

This application is a National Stage application of PCT/US2015/061760, filed Nov. 20, 2015, which claims the benefit of U.S. Provisional Application No. 62/084,155, filed Nov. 25, 2014, both of which are incorporated by reference herein in their entirety.

BACKGROUND

This disclosure relates to weatherable thermoplastic compositions, and in particular to weatherable thermoplastic polymer compositions comprising polyaryl ester blends, methods of manufacture, and uses thereof.

Thermoplastic polymers of various compositions, such as polyesters and polyester-polycarbonate copolymers, are useful in the manufacture of articles and components for a wide range of applications including as automotive parts and electronic appliances. Because of their broad use, it is often necessary for various reasons, including aesthetic and functional reasons, to provide articles and components according to targeted color specifications, which is often accomplished by incorporating dyes or pigments into the polymer melt. It can also be important that the color of the thermoplastic composition is stable after exposure to various conditions such as heat exposure, light exposure (including ultraviolet (UV) light exposure), etc. Many polymers, including the above-described polyesters and polyester-polycarbonate copolymers, have been found to be subject to yellowing after light exposure, which can adversely impact the color stability performance of a thermoplastic composition. This yellowing phenomenon, sometimes referred to as photoyellowing, can be addressed by inclusion of various additives such as UV absorbers (UVA's), stabilizers including hindered amine light stabilizers (HALS), and dyes and pigments (e.g., for color compensation or light filtration), and combinations thereof.

Polyaryl esters, as used herein, include polyesters derived from aromatic diacids (i.e., polyarylates) and from aromatic diols. Polyaryl esters are known to be susceptible to photoyellowing that has been difficult to address with known techniques and materials, especially for some colors and some shades of some colors. Accordingly, there remains a need in the art for new solutions to color stability of polyaryl esters across a variety of targeted color specifications.

SUMMARY

A thermoplastic composition comprises a polyaryl ester, a polymer different from the polyaryl ester, and a phthalone compound according to the formula

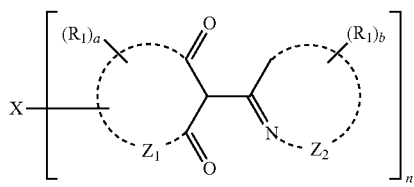

wherein $Z_1$ represents the atoms necessary to complete a 9- to 13-membered single or fused aromatic ring structure, $Z_2$ represents the atoms necessary to complete a pyridine or quinoline ring, each $R_1$ and each $R_2$ are independently halogen, an alkyl group, an aryl group, a heterocyclic group, an alkoxy group, an aryloxy group, an aromatic or aliphatic thioether group, an aromatic or aliphatic carboxylic acid ester group, or an aromatic or aliphatic amide group, a is 0 to 6, b is 0 to 4, n is 1 or 2, and X is present only if n=2, and is a single bond or a divalent organic radical bonded to the $Z_1$ ring structure through an ether, ketone, or thio linkage.

An article comprises the thermoplastic composition. In another embodiment, a method of making an article comprises heating the composition to a melt temperature of at least 250° C., and extruding or molding the article. Articles prepared by the disclosed method are also described.

A polymer coating disposed on the surface of an article comprises the thermoplastic composition to protect the article from weathering effects.

The above-described and other features are exemplified by the following Figures, Detailed Description, Examples, and Claims.

BRIEF DESCRIPTION OF THE FIGURES

A description of the figures, which are meant to be exemplary and not limiting, is provided in which:

FIG. 3A shows the color shift for the composition of example 1 (no phthalone, no UV stabilizer);

FIG. 3B shows the color shift for composition of example 7 (no UV stabilizer); FIG. 3C shows the color shift for the composition of example 10 (phthalone+UV stabilizer).

FIG. 6A, FIG. 6C, and FIG. 6E show color change in samples prepared without 4-chloropyrophthalone at thicknesses of 1.6, 3.1, and 2.5 millimeters, respectively. FIG. 6B, FIG. 6D, and FIG. 6F show color change in samples prepared with 4-chloropyrophthalone at thicknesses of 1.6, 3.1, and 2.5 millimeters, respectively.

FIG. 7A shows pyrophthalone at dwell times of 360 and 1080 seconds (s); FIG. 7B shows tetrachloropyrophthalone at 360 s dwell time; FIG. 7C shows tetrachloropyrophthalone at 1080 s dwell time.

FIG. 8A shows pyrophthalone loading; FIG. 8B shows tetrachloropyrophthalone loading; and FIG. 8C shows 4-chloropyrophthalone loading.

DETAILED DESCRIPTION

Figure 1A:
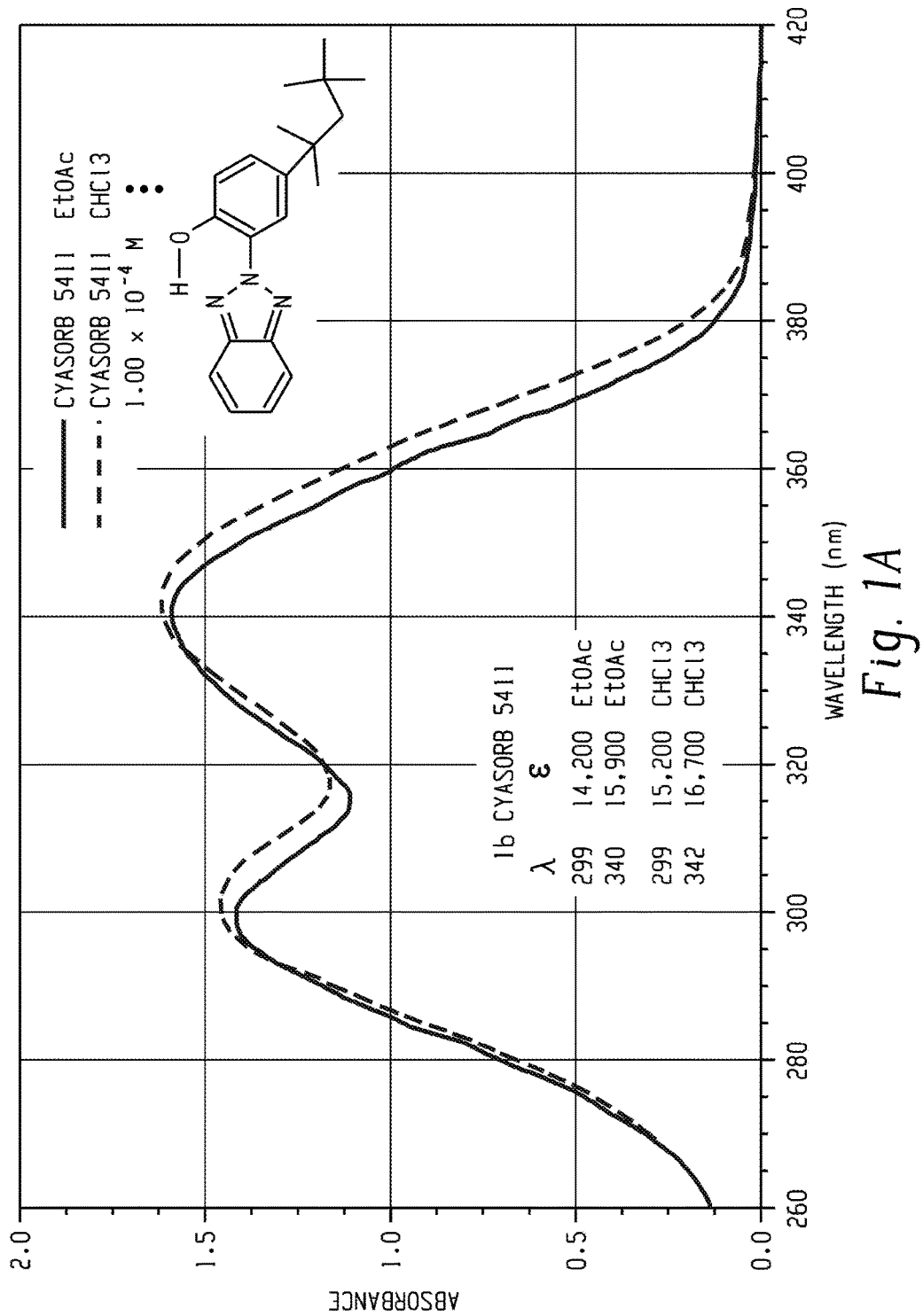
FIGS. 1A-C shows a comparison of UV/Vis spectra for Cyasorb 5411 (FIG. 1A), pyrophthalone (FIG. 1B), and dibenzoyl resorcinol (DBR) (FIG. 1C).

The inventors have discovered weatherable thermoplastic compositions that include a polyaryl ester, a polymer different from the polyaryl ester, and a phthalone compound. The compositions have excellent melt stability and processability that are not adversely affected by the presence of the phthalone compounds. In addition, the compositions had exceptional weathering stability, specifically with regard to percent transmission, haze, and yellowing. The phthalones were also found to dually act as color compensators and as UV absorbers. This discovery allows for incorporation of a UV stabilizer to be optional. It was further found that the required loading of phthalone to maintain article transparency depends on the thickness of the article, such that easy preparation of weatherable articles having a desired thickness can be prepared.

As used herein, polyaryl esters are polymers comprising ester repeat units having aromatic content. In some embodiments, this aromatic content can be derived from an aromatic diacid, in which case the polymer is referred to as a "polyarylate," or the aromatic content can be derived from an aromatic diol. Aromatic diacids can include isophthalic acid, terephthalic acid, or mixtures of isophthalic and terephthalic acids. Suitable dicarboxylic acids also include those derived from aromatic polycyclic compounds, illustrative examples of which include diphenyl dicarboxylic acid, diphenylether dicarboxylic acid, and naphthalene dicarboxylic acids, such as naphthalene-2,6-dicarboxylic acid. Alternatively, dicarboxylic acid derivatives, such as diesters of dicarboxylic acids or acid halides of dicarboxylic acids (e.g., diacid chlorides), can be used to prepare polyaryl esters.

In some embodiments, the polyaryl ester comprises at least 5 weight percent (wt %), based on the weight of the polyaryl ester, of repeat units according to formula (1)

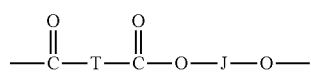

(1)

in which at least 80 percent of the total number of T groups, or at least 80 percent of the total J groups contain aromatic moieties and the balance thereof are aliphatic, alicyclic, or aromatic. Aromatic T groups can be derived from aromatic dicarboxylic acids such as or a diacid of a $C_{6-20}$ arylene group. More specifically, isophthalic or terephthalic acid, 1,2-di(p-carboxyphenyl) ethane, 4,4'-dicarboxydiphenyl ether, 4,4'-bisbenzoic acid, or a combination comprising at least one of the foregoing acids can be used. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 97:3 to 2:98. In another specific embodiment, J is a $C_{2-6}$ alkylene group or a phenylene group and T is p-phenylene, m-phenylene, or naphthalene. Other non-aromatic diacids can be used such as a diacid of a $C_{2-18}$ alkylene group or a $C_{6-20}$ cycloalkylene, including adipic acid, succinic acid, sebacic acid, dodecanoic acid, a divalent cycloaliphatic group, or a combination thereof. In some embodiments, at least 80 percent of the total number of T groups contain aromatic moieties. In more specific embodiments, at least 90 percent, more specifically 95 percent, or even more specifically 100 percent, of the T groups contain aromatic moieties.

Aromatic J groups can be derived from aromatic diols such as resorcinol, hydroquinone, catechol, 4,4'-dihydroxybiphenyl, 1,6-dihydroxynaphthalene, 2,6-dihydroxynaphthalene, bisphenol A, bis(4-hydroxyphenyl)methane, and various other well-known bisphenol compounds and $C_{6-20}$ arylene diols. In some embodiments, aromatic J groups are derived from resorcinol. Nonaromatic J groups can be derived from dihydroxy compounds of a $C_{2-10}$ alkylene, a $C_{6-20}$ cycloalkylene, or a polyoxyalkylene group in which the alkylene groups contain 2 to 6 carbon atoms, specifically 2, 3, or 4 carbon atoms. Poly(ethylene terephthalate) is a polyester having T groups derived from terephthalic acid and J groups derived from ethylene glycol. In another embodiment, J is a $C_{2-30}$ alkylene group having a straight chain, branched chain, or cyclic (including polycyclic) structure.

In a preferred embodiment the polyarylate includes aromatic dicarboxylic acid residues of formula (2) derived from reaction of a diol with an isophthalic or terephthalic acid (or a derivative of the acid, such as the acid halides, carboxylic acid esters, anhydrides, and carboxylic acid salts of isophthalic or terephthalic acid).

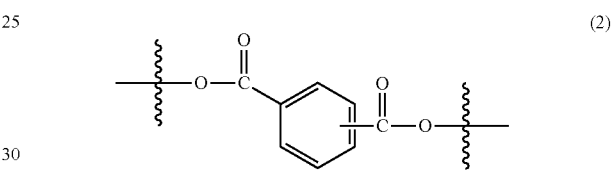

(2)

When an aromatic diol such as resorcinol is used in the formation of a polyaryl ester, the resulting structure is shown in Formula (3)

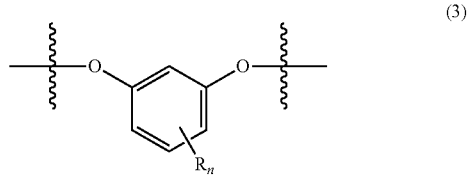

(3)

wherein each R is independently a $C_{1-12}$ alkyl, $C_6$-$C_{24}$ aryl, $C_6$-$C_{24}$ alkylarylene, $C_1$-$C_{12}$ alkoxy, or halogen, and n is 0 to 4, preferably wherein R is a $C_{1-3}$ alkyl, $C_1$-$C_3$ alkoxy, or halogen, and n is 0 or 1. The vertical wavy lines in formulas (2) and (3) denote the periphery of the dicarboxylic acid residue, and thus are positioned differently from the conventional position used to denote a polymer repeat unit.)

The polyaryl esters can be branched or linear. The polyaryl esters can be polyaryl ester homopolymers, where all the repeat units in the polymer are ester units according to formula (1) (although T and J can vary), or they can be copolymers where at least 5 wt % of the units (e.g., 5-30 wt %, or 5-20 wt %), and more specifically at least 70 wt % (e.g., 75-90 wt %, or 75-85 wt %) of the units are ester units according to formula (1). The remaining polymer units can be any other type of polymer unit known to be copolymerizable with polyester, such as carbonate units, with the weight percentages based on the total weight of the copolymer.

"Carbonate units" and polycarbonates as used herein means units or a polymer having repeating structural carbonate units of formula (4)

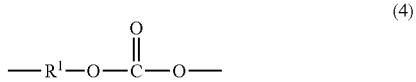

(4)

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (5) or a bisphenol of formula (6).

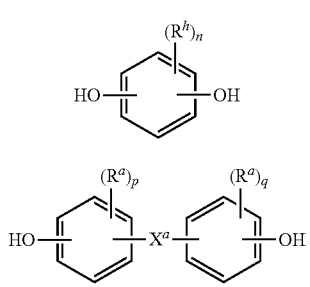

In formula (5), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (6), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Some illustrative examples of specific dihydroxy compounds include bisphenol compounds such as 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2, 3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl) propane, 2,2-bis(3-ethyl-4-hydroxyphenyl) propane, 2,2-bis(3-n-propyl-4-hydroxyphenyl) propane, 2,2-bis(3-isopropyl-4-hydroxyphenyl)propane, 2,2-bis(3-sec-butyl-4-hydroxyphenyl) propane, 2,2-bis(3-t-butyl-4-hydroxyphenyl)propane, 2,2-bis(3-cyclohexyl-4-hydroxyphenyl) propane, 2,2-bis(3-allyl-4-hydroxyphenyl) propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl) ethylene, 1,1-dibromo-2,2-bis(4-hydroxyphenyl)ethylene, 1,1-dichloro-2,2-bis(5-phenoxy-4-hydroxyphenyl) ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl) ether, bis(4-hydroxyphenyl)ether, bis(4-hydroxyphenyl)sulfide, bis(4-hydroxyphenyl) sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3, 5,6-tetrafluoro hydroquinone, 2,3,5,6-tetrabromo hydroquinone, or the like.

Specific dihydroxy compounds include resorcinol, 2,2-bis (4-hydroxyphenyl) propane ("bisphenol A" or "BPA", in which in which each of $A^1$ and $A^2$ is p-phenylene and $Y^1$ is isopropylidene in formula (3)), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl) cyclohexane (DMBPC), and from bisphenol A and 1,1-bis (4-hydroxy-3-methylphenyl)-3,3,5-trimethylcyclohexane (isophorone bisphenol).

In a specific embodiment, the polyaryl ester-polycarbonate copolymer is a poly(bisphenol A carbonate)-co-(bisphenol A-phthalate-ester) of formula (7)

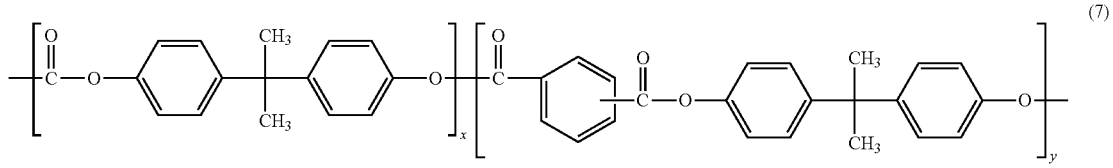

(7)

wherein y and x represent the weight percent of arylate-bisphenol A ester units and bisphenol A carbonate units, respectively. Generally, the units are present as blocks. In an embodiment, the weight percent of ester units y to carbonate units x in the copolymers is 50:50 to 99:1, or 55:45 to 90:10, or 75:25 to 95:5. Copolymers of formula (7) comprising 35 to 45 wt % of carbonate units and 55 to 65 wt % of ester units, wherein the ester units have a molar ratio of isophthalate to terephthalate of 45:55 to 55:45 are often referred to as poly(carbonate-ester)s (PCE) and copolymers comprising 15 to 25 wt % of carbonate units and 75 to 85 wt % of ester units having a molar ratio of isophthalate to terephthalate from 98:2 to 88:12 are often referred to as poly(phthalate-carbonate)s (PPC).

In another embodiment, a specific polyester-carbonate copolymer is a poly(carbonate)-co-(monoaryl arylate ester) containing carbonate units (4) and repeating monoaryl arylate ester units of formula (8)

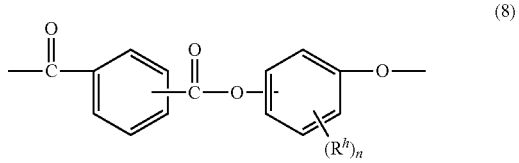

(8)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. Specifically, each $R^h$ is independently a $C_{1-4}$ alkyl, and n is 0 to 3, 0 to 1, or 0. These poly(carbonate)-co-(monoaryl arylate ester) copolymers are of formula (9)

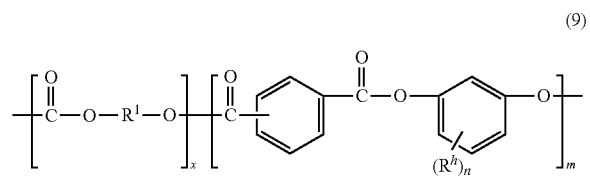

(9)

wherein $R^1$ is as defined in formula (4) and $R^h$, and n are as defined in formula (8), and the mole ratio of x:m is 99:1 to 1:99, specifically 80:20 to 20:80, or 60:40 to 40:60.

Specifically, the monoaryl-arylate ester unit (8) is derived from the reaction of a combination of isophthalic and terephthalic diacids (or derivatives thereof) with resorcinol (or reactive derivatives thereof) to provide isophthalate-terephthalate-resorcinol ("ITR" ester units) of formula (10)

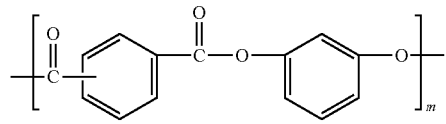

(10)

wherein m is 4 to 100, 4 to 90, 5 to 70, more specifically 5 to 50, or still more specifically 10 to 30. In an embodiment, the ITR ester units are present in the polycarbonate copolymer in an amount greater than or equal to 95 mol %, specifically greater than or equal to 99 mol %, and still more specifically greater than or equal to 99.5 mol % based on the total moles of ester units in the copolymer. Such (isophthalate-terephthalate-resorcinol)-carbonate copolymers ("ITR-PC") can possess many desired features, including toughness, transparency, and weatherability. ITR-PC copolymers can also have desirable thermal flow properties. In addition, ITR-PC copolymers can be readily manufactured on a commercial scale using interfacial polymerization techniques, which allow synthetic flexibility and composition specificity in the synthesis of the ITR-PC copolymers.

A specific example of a poly(carbonate)-co-(monoaryl arylate ester) is a poly(bisphenol A carbonate)-co-(isophthalate-terephthalate-resorcinol ester) of formula (11)

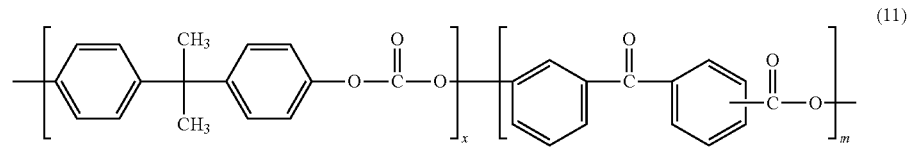

(11)

wherein m is 4 to 100, 4 to 90, 5 to 70, more specifically 5 to 50, or still more specifically 10 to 30, and the mole ratio of x:m is 99:1 to 1:99, specifically 90:10 to 10:90. The ITR ester units are present in the poly(carbonate-arylate ester) copolymer in an amount greater than or equal to 95 mol %, specifically greater than or equal to 99 mol %, and still more specifically greater than or equal to 99.5 mol % based on the total moles of ester units. Other carbonate units, other ester units, or a combination thereof can be present, in a total amount of 1 to 20 mole % based on the total moles of units in the copolymers, for example resorcinol carbonate units of formula (12) and bisphenol ester units of formula (13)

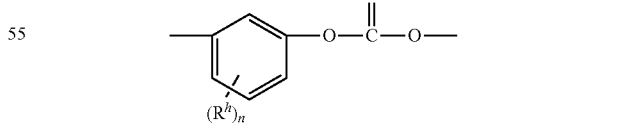

(12)

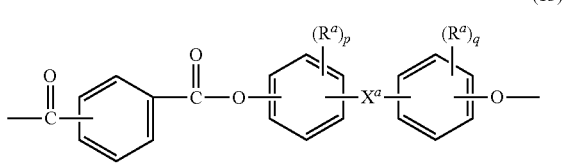

(13)

wherein, in the foregoing formulae, $R^h$ is each independently a $C_{1-10}$ hydrocarbon group, n is 0 to 4, $R^a$ and $R^b$ are each independently a $C_{1-12}$ alkyl, p and q are each independently integers of 0 to 4, and $X^a$ is a single bond, —O—, —S—, —S(O)—, —S(O)$_2$—, —C(O)—, or a $C_{1-13}$ alkylidene of formula —C($R^c$)($R^d$)— wherein $R^c$ and $R^d$ are each independently hydrogen or $C_{1-12}$ alkyl, or a group of the formula —C(=$R^e$)— wherein $R^e$ is a divalent $C_{1-12}$ hydrocarbon group. The bisphenol ester units can be bisphenol A phthalate ester units of the formula (14).

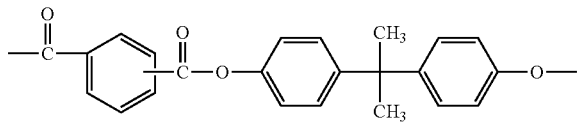

(14)

In an embodiment, poly(bisphenol A carbonate)-co-(isophthalate-terephthalate-resorcinol ester) (11) comprises 1 to 20 mol % of bisphenol A carbonate units, 20-98 mol % of isophthalic acid-terephthalic acid-resorcinol ester units, and optionally 1 to 60 mol % of resorcinol carbonate units, isophthalic acid-terephthalic acid-bisphenol A phthalate ester units, or a combination thereof.

The polyaryl ester can be present in an amount of 30 to 70 wt %, or specifically, 35 to 65 wt %, or more specifically, 40 to 60 wt %, based on the total weight of the polymer blend. The term "polymer blend" as used herein comprises the polyaryl ester and a polymer different than the polyaryl ester.

Polyaryl esters (including copolymers of polyester and polycarbonate) can be manufactured by any of a number of known techniques. One technique involves a catalyzed polycondensation transesterification reaction between diol and diacid, and optionally a carbonate source such as a dicarbonate ester, and is also known as melt polymerization. Another technique involves an acylation reaction between a diol and an acid halide analog of a dicarboxylic acid, and optionally a carbonate source such as phosgene (also known as interfacial polymerization). For example, with interfacial polymerization, instead of using isophthalic acid, terephthalic acid, or a combination comprising at least one of the foregoing acids, isophthaloyl dichloride, terephthaloyl dichloride, or a combination comprising at least one of the foregoing dichlorides can be used. Phase transfer catalysts can be used to promote either interfacial or melt polymerization. Exemplary phase transfer catalysts include catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Phase transfer catalysts include, for example, [CH$_3$(CH$_2$)$_3$]$_4$NX, [CH$_3$(CH$_2$)$_3$]$_4$PX, [CH$_3$(CH$_2$)$_5$]$_4$NX, [CH$_3$(CH$_2$)$_6$]$_4$NX, [CH$_3$(CH$_2$)$_4$]$_4$NX, CH$_3$[CH$_3$(CH$_2$)$_3$]$_3$NX, and CH$_3$[CH$_3$(CH$_2$)$_2$]$_3$NX, wherein X is Cl$^-$, Br$^-$, a $C_{1-8}$ alkoxy group or a $C_{6-18}$ aryloxy group. The phase transfer catalyst can be used in an amount of 0.1 to 10 wt %, more specifically from 0.5 to 2 wt %, based on the weight of diol in the polymerization reaction mixture.

A chain stopper (also referred to as a capping agent) can be included during polymerization. The chain stopper limits molecular weight growth rate, and so controls molecular weight in the polymer. Chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol or ($C_{8-9}$alkyl)-substituted phenols with branched chain alkyl substituents. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Mono-carboxylic acid chlorides include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Branched polyaryl esters and copolymers can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of 0.05 to 2.0 wt %, based on the total weight of the polyaryl ester or copolymer. Mixtures comprising linear polymers and branched polymers can be used.

The thermoplastic composition comprises a combination, preferably a blend, of the above-described polyaryl esters with a polymer different from the polyaryl ester. In general, any thermoplastic polymer can be combined or blended with the polyaryl ester to form the blended thermoplastic composition. Thermoplastic polymers are typically high molecular weight polymers. Examples of thermoplastic polymers that can be used include polyacetals, polyacrylics, polycarbonates, polystyrenes, polyolefins, polyesters, polyamides, polyaramides, polyamideimides, polyarylates, polyphenylene ethers, polyurethanes, epoxies, phenolics, silicones, polyarylsulfones, polyethersulfones, polyphenylene sulfides, polysulfones, polyimides, polyetherimides, polysiloxane-polyimides, polysiloxane-polycarbonates, polytetrafluoroethylenes, polyetherketones, polyetheretherketones, polyetherketoneketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polypropylenes, polyethylenes, polyethylene terephthalates, polyvinylidene fluorides, polysiloxanes, or the like, or a combination comprising at least one of the foregoing thermoplastic polymers. In some embodiments, polyolefins include polyethylene or poly(alpha-olefin)s. As used herein, poly(alpha-olefin) means a polymer made by polymerizing an alpha-olefin. An alpha-olefin is an alkene where the carbon-carbon double bond starts at the alpha-carbon atom. Exemplary poly(alpha-olefin)s include polypropylene, poly(1-butene) and polystyrene. Exemplary polyesters include condensation polymers of a $C_{2-10}$dicarboxylic acid and a $C_{2-10}$alkylenediol. Exemplary polyamides include condensation polymers of a $C_{2-10}$dicarboxylic acid and a $C_{2-10}$alkylenediamine.

In some embodiments, the polymer different from the polyaryl ester is a polycarbonate, which includes homopolymers, copolymers, and combinations of the foregoing. In a specific embodiment, the polycarbonate is a bisphenol A-polycarbonate, more specifically a bisphenol A-polycarbonate end-capped with para-cumyl phenol.

The polymer different than the polyaryl ester can be present in an amount of 30 to 70 wt %, or specifically 35 to 65 wt %, or more specifically, 40 to 60 wt %, based on the total weight of the polymer blend.

The thermoplastic composition further comprises a phthalone compound (16)

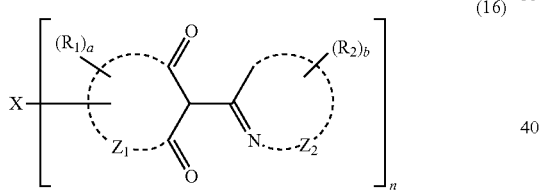

(16)

wherein $Z_1$ i the atoms necessary to complete a 9- to 13-membered single or fused aromatic ring structure, $Z_2$ represents the atoms necessary to complete a pyridine or quinoline ring, each $R_1$ and each $R_2$ are each independently halogen, an alkyl group, an aryl group, a heterocyclic group, an alkoxy group, an aryloxy group, an aromatic or aliphatic thioether group, an aromatic or aliphatic carboxylic acid ester group, or an aromatic or aliphatic amide group, a is 0 to 6, b is 0 to 4, n is 1 or 2, and X is present only if n=2 and is a single bond or a divalent organic radical bonded to the $Z_1$ ring structure through an ether, ketone, or thio linkage.

More specifically, each $R_1$ and each $R_2$ can each independently be halogen, a $C_1$-$C_{18}$ alkyl group, a $C_6$-$C_{12}$ aryl group, a $C_1$-$C_{18}$ alkoxy group, a $C_6$-$C_{12}$ aryloxy group, an aromatic ($C_6$-$C_{12}$) or aliphatic ($C_1$-$C_{18}$) thioether group, an aromatic ($C_7$-$C_{13}$) or aliphatic ($C_2$-$C_{19}$) carboxylic acid ester group, or an aromatic ($C_6$-$C_{12}$) or aliphatic ($C_1$-$C_{18}$) amide group. In some, more specific, embodiments, each $R_1$ and each $R_2$ is each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group. Exemplary aromatic ring structures represented by $Z_1$ and $Z_2$ in formula (16) are depicted in the formulas below.

X is present only if n=2, and is a single bond or a divalent organic radical bonded to the $Z_1$ ring structure through an ether, ketone, or thio linkage. Examples of divalent radicals for X include

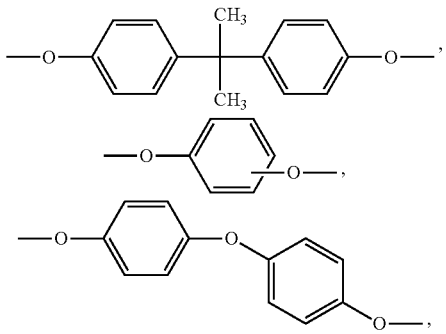

and their thioether analogs.

In some embodiments, the phthalone compound is of formula (16a) or (16b)

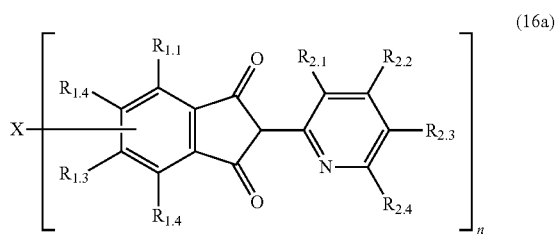

(16a)

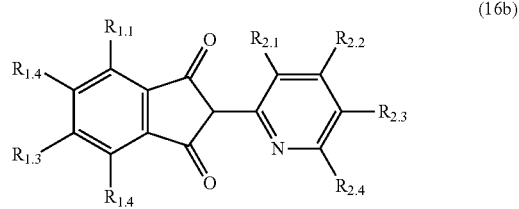

(16b)

wherein $R_{1.1}$, $R_{1.2}$, $R_{1.3}$, $R_{1.4}$, $R_{2.1}$, $R_{2.2}$, and $R_{2.3}$, are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, and in formula (16b) n and X are as in formula (16), and X is present in place of one of $R_{1.1}$, $R_{1.2}$, $R_{1.3}$, or $R_{1.4}$ when n is 2.

In some embodiments, the phthalone compound is of formula (16c) or (16d)

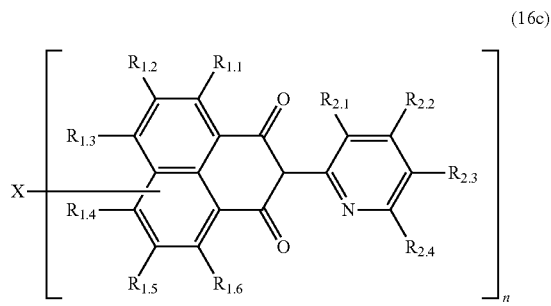

(16c)

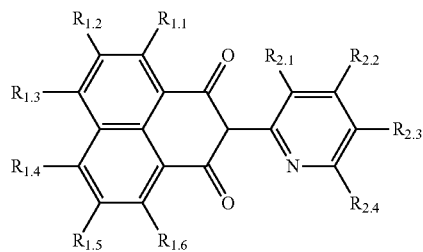

(16d)

wherein $R_{1.1}$, $R_{1.2}$, $R_{1.3}$, $R_{1.4}$, $R_{1.5}$, $R_{1.6}$, $R_{2.1}$, $R_{2.2}$, and $R_{2.3}$, are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, and in formula (16d), n and X are as formula (16), and X is present in place of one of $R_{1.1}$, $R_{1.2}$, $R_{1.3}$, $R_{1.4}$, $R_{1.5}$, or $R_{1.6}$, when n is 2.

In some embodiments, the phthalone compound is of formula (16e) or (16f)

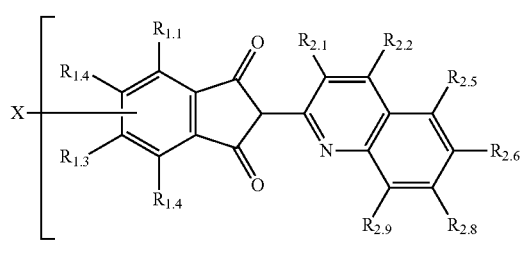

(16e)

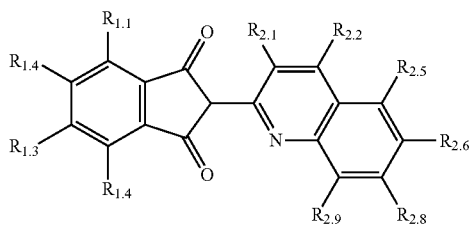

(16f)

wherein $R_{1.1}$, $R_{1.2}$, $R_{1.3}$, $R_{1.4}$, $R_{2.1}$, $R_{2.2}$, $R_{2.5}$, $R_{2.6}$, $R_{2.7}$, $R_{2.8}$, and $R_{2.9}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, and n and X are as in formula (16f), and X is present in place of one of $R_{1.1}$, $R_{1.2}$, $R_{1.3}$, or $R_{1.4}$ when n is 2.

In some embodiments, the phthalone compound is represented by formula (16g) or (16h)

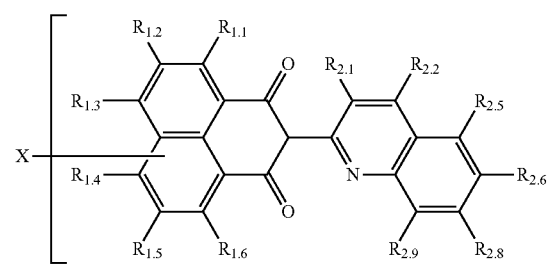

(16g)

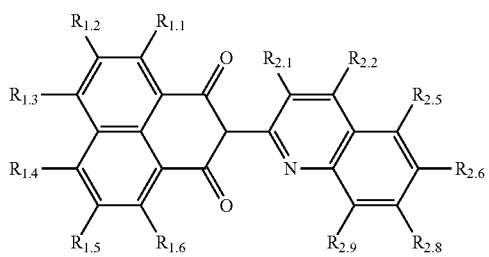

(16h)

wherein $R_{1.1}$, $R_{1.2}$, $R_{1.3}$, $R_{1.4}$, $R_{2.1}$, $R_{2.2}$, $R^{2.5}$, $R_{2.6}$, $R_{2.7}$, $R_{2.8}$, and $R_{2.9}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, and n and X are as in formula (16), and X is present in place of one of $R_{1.1}$, $R_{1.2}$, $R_{1.3}$, $R_{1.4}$, $R_{1.5}$, or $R_{1.6}$, when n is 2.

In some embodiments, the atoms $Z_1$ necessary to complete a 9- to 13-membered single or fused aromatic ring structure form a second phthalone structure, as shown in formula (16i)

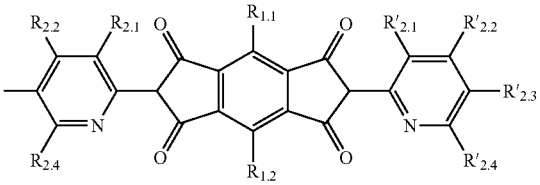

(16i)

wherein $R_{1.1}$, $R_{1.2}$, $R_{2.1}$, $R_{2.2}$, $R_{2.3}$, $R_{2.4}$, $R'_{2.1}$, $R'_{2.2}$, $R'_{2.3}$, and $R'_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group. A quinoline ring can be present in place of the pyridine rings in formula (16i).

Specific phthalone compounds are of the formulas (16j), (16k), or (16l) below.

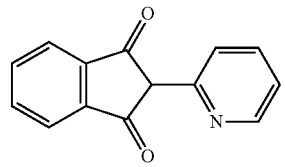

(16j)

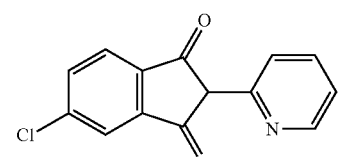

(16k)

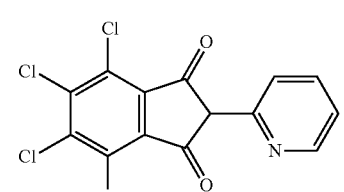

(16l)

The phthalone compounds can be synthesized by known techniques, such as a condensation reaction of a substituted or unsubstituted phthalic anhydride (or phthalic anhydride derivative or analog such as of naphthalic anhydride or the anhydride of phenyl tetracarboxylic acid) with a substituted or unsubstituted 2-methylpyridine or a substituted or unsubstituted 2-methylquinoline. X linking groups can be derived from appropriate substituents on the anhydride compound.

The amount of phthalone compound can vary based on a number of factors such as the thickness of the fabricated article (particularly for transparent or translucent articles), whether or not an opacifier such as $TiO_2$ is present, and the color of the composition. Table 1 shows representative loadings of the phthalone compound as weight percentages based on the total polyaryl ester blend weight.

TABLE 1

| Article thickness (mm) | Loading levels (wt %) | Loading levels (preferred) (wt %) | Loading Levels (most preferred) (wt %) |
|---|---|---|---|
| 0.035-0.49 | 0.0001-1 | 0.001-0.1 | 0.01-0.05 |
| 0.5-1.49 | 0.0001-0.1 | 0.0001-0.01 | 0.0001-0.005 |
| 1.5-2.49 | 0.0001-0.1 | 0.0001-0.01 | 0.0001-0.005 |
| 2.5-3 | 0.0001-0.1 | 0.0001-0.01 | 0.0001-0.005 |

The phthalone compound is present in an amount of 0.0001 wt % to 1 wt %, preferably 0.001 wt % to 0.14 wt %, most preferably 0.01 wt % to 0.1 wt %, or 0.02 wt % to 0.08 wt %, each based on the total weight of the polymers in the composition. Different loading levels can be used when an opacifier such as $TiO_2$ is present. In some embodiments, the opacifier, preferably $TiO_2$, is present in an amount of 0.1 wt % to 15 wt %, preferably 0.2 wt % to 5 wt %, more preferably 0.5 wt % to 2 wt %, each based on the total weight of the polymers in the composition.

The relationship between an optimal amount of phthalone and the thickness of a desired article can be determined, for example, by the following procedure. A series of compositions having varying amounts of phthalone dye are prepared, where the amount of phthalone in the compositions ranges from below to above the expected target levels of phthalone. The compositions are molded into chips having varying thicknesses spanning the target thickness, for example in a range extending from lower than to higher than the desired thickness. Color measurements are performed on each of the samples before and after exposure, specifically measuring the color shift. The color vector of interest, for example, delta E, delta a, and delta b (DE, Da, and Db, respectively), can be plotted for each thickness, and the equation of the line can be derived from the plot. The optimal level of phthalone dye can be determined from the line, by setting the color shift of the aforementioned equation equal to zero. The optimal dye loadings can be plotted against article thickness, with the equation of the line derived from this plot describing the optimal phthalone dye loading for an article of a given thickness.

Without being bound by theory, it is believed that the favorable results obtained herein, i.e., weatherable polyaryl ester thermoplastic compositions, are provided from the phthalone dyes that are sufficiently thermally stable to withstand polyaryl ester processing temperatures, while offering an exposure-induced decrease in absorbance (i.e., photobleaching) that is complementary, in wavelength range (e.g., 400 to 450 nm), amount of decrease in absorbance, and/or rate of decrease in absorbance, with the increase in the visible absorbance (i.e., photoyellowing) experienced by polyaryl ester compositions.

In some embodiments, the thermoplastic composition exhibits color stability wherein a 35 micrometer thick film of the thermoplastic composition exhibits a change in ΔE value of the CIE1976 L*, a*, b* color system (as used herein, "ΔE" refers to $\Delta E^*_{ab}$ as determined according to ISO 11664-4:2008(E)/CIE S 014-4/E:2007, with color measurements made according to ASTM D2244-11, more specifically using a MACBETH ColorEye 7000 Spectrophotometer (with illuminant D65, observer angle of 10°, geometry-specular component included, calibration transmission mode), of less than or equal to 1.0 (more specifically ≤0.7, and even more specifically ≤0.5) after 252 kJ/m² of exposure according to accelerated weathering testing protocol of ASTM G-155-05a, as compared to fresh non-aged sample. Color stability and amelioration of photoyellowing can be especially advantageous for colored thermoplastic compositions, and in some embodiments the thermoplastic composition exhibits CIE1976 L*, a*, b* values determined according to ASTM D2244-11 under the above-described conditions of an L* value of greater than 60 (more specifically greater than 65), an a* value of greater than or equal to −1, and a b* value of less than or equal to 1 (more specifically less than or equal to 0.5). Targeted color specifications are typically achieved by using one or more dyes or pigments, as further exemplified below. In some embodiments, as is known in the coloration art, a blue colorant and optionally a red colorant are used in combination with the phthalone compound to color balance the visible yellow color of the phthalone compound.

In some embodiments, the phthalone compound has a decomposition onset temperature, $T_d$, of at least 250° C., more specifically at least 270° C. as determined according to ASTM E2550-11 using a nitrogen or other inert atmosphere and temperature ramp of 20° C./min ranging from 25° C. to 800° C. $T_d$ can be determined using thermogravimetric analysis (also referred to as "TGA") using a TGA 2950 instrument equipped with an auto sampler, and available from TA Instruments. TGA measures the amount of weight change in a material as a function of temperature in a controlled atmosphere. TGA can be carried out either using a programmed temperature setting whereby the sample is heated at a pre-determined rate, or the sample is subjected to a constant temperature (isothermal condition). In the present disclosure the sample was equilibrated to an initial temperature of 40° C. for a period of 2 to 3 minutes and then heated at the rate of 10° C. per minute up to a maximum temperature of 600° C. under air. The weight of the sample was monitored continuously throughout the heating process. Any weight loss is generally indicative of decomposition or degradation of the sample. This technique was used to measure the thermal stability for the phthalone compounds disclosed herein. The thermal stability data in turn was used to identify phthalone compounds that can be beneficially used as colorants in colored polymer compositions. In general the higher the decomposition temperature of an phthalone compound, the more suitable it will be as a colorant for high temperature compositions and high temperature end uses. A weight loss temperature curve can be generated from the TGA experiment. The TGA results are expressed in terms of $T_d$ (also referred to as Decomposition Onset Temperature). For the purposes of this disclosure, $T_d$ represents the inflection point on the weight loss temperature curve. In other words, $T_d$ is the temperature corresponding to the point at which the tangent to the curve has the highest slope.

The thermoplastic composition can further include an additive such as an impact modifier. Impact modifiers include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR) silicone elastomers, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), high rubber graft (HRG), and the like. For use in weatherable applications, it can be beneficial to use impact modifiers that have good UV resistance, such as acrylic and/or siloxane impact modifiers.

In addition to the polyaryl ester, the polymer different from the polyaryl ester, and the phthalone (and any impact modifier), the thermoplastic composition can include various additives ordinarily incorporated into polymer compositions of this type. Such additives can be mixed at a suitable time during the mixing of the components for forming the composition. Additives include fillers, reinforcing agents, antioxidants, heat stabilizers, light stabilizers (including ultraviolet (UV) light stabilizers), plasticizers, lubricants, mold release agents, antistatic agents, epoxides, colorants such as such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. In general, the additives are used in the amounts generally known to be effective. The total amount of additives (other than any impact modifier, filler, or reinforcing agents) is generally 0.01 to 5 wt %, based on the total weight of the composition.

In some embodiments, the composition comprises one or more, and preferably all of 0.1 to 1 wt % of a polyhydric alcohol fatty acid ester, such as pentaerythritol tetrastearate, as a mold release additive; 0.01 to 1 wt % of an aromatic sulfone sulfonate, such as potassium diphenylsulfone sulfonate, as a flame retardant additive; 0.1 to 1 wt % of a benzotriazole, such as 2-(2-hydroxy-5-tert-octylphenyl)benzotriazole, as a UV stabilizer; 0.01 to 1 wt % of an epoxy resin, specifically, a cycloaliphatic epoxy resin, for example, 3,4-epoxycyclohexylmethyl-3,4-epoxycyclohexanecarboxylate as a mold release additive. In some embodiments, the composition can further comprise 0.01 to 1 wt % of an acid, such as a phosphonous acid ester, for example, a biphenyl/2,4-di-tert-butylphenol/phosphorus trichloride reaction product as a flame retardant.

As mentioned above, other colorants such as pigment and/or dye additives can also be present in addition to the pyrophthalone compound. Exemplary pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.0001 to 1 parts by weight, based on 100 parts by weight of polymer and impact modifier.

Dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinoline-2; 7-dimethylamino-4-methylquinoline-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.001 to 1 parts by weight, based on 100 parts by weight of the polymer and impact modifier.

The thermoplastic compositions can be manufactured by various methods. For example, powdered polymer, the phthalone compound, and/or other optional components are first blended, optionally with fillers in a HENSCHEL-Mixer* high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water bath and pelletized. The pellets, so prepared, when cutting the extrudate can be one-fourth inch long or less as desired. Such pellets can be used for subsequent molding, shaping, or forming.

Shaped, formed, or molded articles comprising the thermoplastic compositions are also provided. The thermoplastic compositions can be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. For example, the article can be an electronic display window, an illuminant lens or cover, or an opaque automotive component. For example, the article can be a component for agricultural tractors or equipment, industrial or construction equipment, recreational vehicles, golf carts, all-terrain vehicles, marine ships, watercrafts, and lawn care equipment, where the component is, for example, a grille, an applique, a visor, and a trim part. The article can be a component, a fender, a grille, an applique, a visor, and a trim part for an automotive vehicle or truck. The article can be a component for a marine buoy. The article can be a sheet, a multi-layered sheet, a multi-wall sheet, a multi-layered-multi-wall sheet, or a combination comprising at least one of the foregoing. The composition can further be used as a coating on an article to protect the article from weathering effects. For example, any of the above mentioned articles can comprise a polymer coating disposed on the surface of the article, where the polymer coating comprises the thermoplastic composition to protect the article from weathering effects.

In summary, the present disclosure provides weatherable thermoplastic compositions having good melt stability and processability. Specifically, the additives of the thermoplastic composition were not observed to adversely affect the physical properties of the composition, during processing or accelerated weathering testing. The additives also did not adversely affect polymer properties such as viscosity and melt volume-flow rate. The compositions provided were demonstrated to provide exceptional weathering stability, specifically with regard to percent transmission, haze, and yellowing according to ASTM G155-05a accelerated weathering protocol. The phthalone dyes were also found to dually act as color compensators and as UV absorbers. This discovery allows for incorporation of a UV stabilizer to be optional, however the data suggests an additional synergistic advantage of using the phthalone dye in combination with a conventional UV stabilizer. Furthermore, the required loading of phthalone to maintain article transparency was found to be dependent upon the thickness of the article, and a method for deriving that relationship is provided, thus allowing for the facile preparation of weatherable articles having a desired thickness by adjusting the phthalone content accordingly. The thermoplastic compositions presented herein are thus useful as additives, blends, and coatings to protect articles from weathering effects.

The thermoplastic compositions are further illustrated by the following non-limiting examples.

EXAMPLES

Materials for the following examples are listed in Table 2.

TABLE 2

| Component | Description | Source |
|---|---|---|
| ITR-PC | Para-cumyl phenol (PCP)-capped poly(bisphenol A carbonate)-co-(isophthalate-terephthalate-resorcinol ester); MW: 20,000 Daltons; 20 wt % polyarylate derived from a 50/50 wt % blend of isophthalate and terephthalate (50/50) diacid residues and resorcinol diol residues, and 80 wt % BPA-PC. | SABIC |
| PCP100 | Bisphenol A polycarbonate (linear) end-capped with para-cumyl phenol, having a MW = 29,900 Daltons and MVR at 300° C./1.2 kg of 23.5 to 28.5 g/10 min. | SABIC |
| PCP1300 | Bisphenol A polycarbonate (linear) end-capped with para-cumyl phenol, having a MW = 21,900 Daltons and MVR at 300° C./1.2 kg of 5.1 to 6.9 g/10 min. | SABIC |
| KSS | Potassium diphenylsulfone sulfonate | Lanxess |
| PES | Pentaerythritol tetrastearate | FACI Chemicals |
| CER | 3,4-epoxycyclohexylmethyl-3,4-epoxycyclohexanecarboxylate | Various |
| PAE | IRGAFOS P-EPQ (biphenyl/2,4-di-tert-butylphenol/phosphorus trichloride reaction product) | Clariant |
| UV-C | Cyasorb ®5411 (2-(2-hydroxy-5-tert-octyrphenyl)benzotriazole) | Cytec |
| PPT | Pyrophthalone | SABIC |
| PPT-Cl | 4-chloropyrophthalone | SABIC |
| PPT-Cl$_4$ | 1,2,3,4-tetrachloropyrophthalone | SABIC |

The thermoplastic compositions of the following examples were prepared by melt-blending the components, folding by extrusion, and molding into an article having the desired shape. For example, the polyaryl ester, the polymer different from the polyaryl ester, the phthalone compound, and optionally any additional additive components are first blended in a HENSCHEL-Mixer high speed mixer. The blend is then fed into the throat of a 30 millimeter (mm) twin-screw extruder via a hopper. The extruder is generally operated at a temperature higher than necessary to cause the composition to flow. The extruded compositions are immediately quenched in a water bath and pelletized. The pellets are subsequently molded, shaped, or otherwise formed into articles. For example, the samples were molded with a barrel set temperature of about 288° C. and a mold temperature of about 80° C.

The molded parts for all compositions were prepared with varying thickness, for example 1.6, 2.5, or 3.1 millimeters (mm).

The molded parts comprising the thermoplastic composition were exposed to accelerated weathering conditions according to ASTM G155-05a.

Yellowness Index (YI) for laboratory scale samples is measured in accordance with ASTM E313-10. Transparency is described by two parameters, percent transmission and percent haze. Percent transmission and percent haze for laboratory scale samples were determined using ASTM D1003-11e1.

Figure 1B:
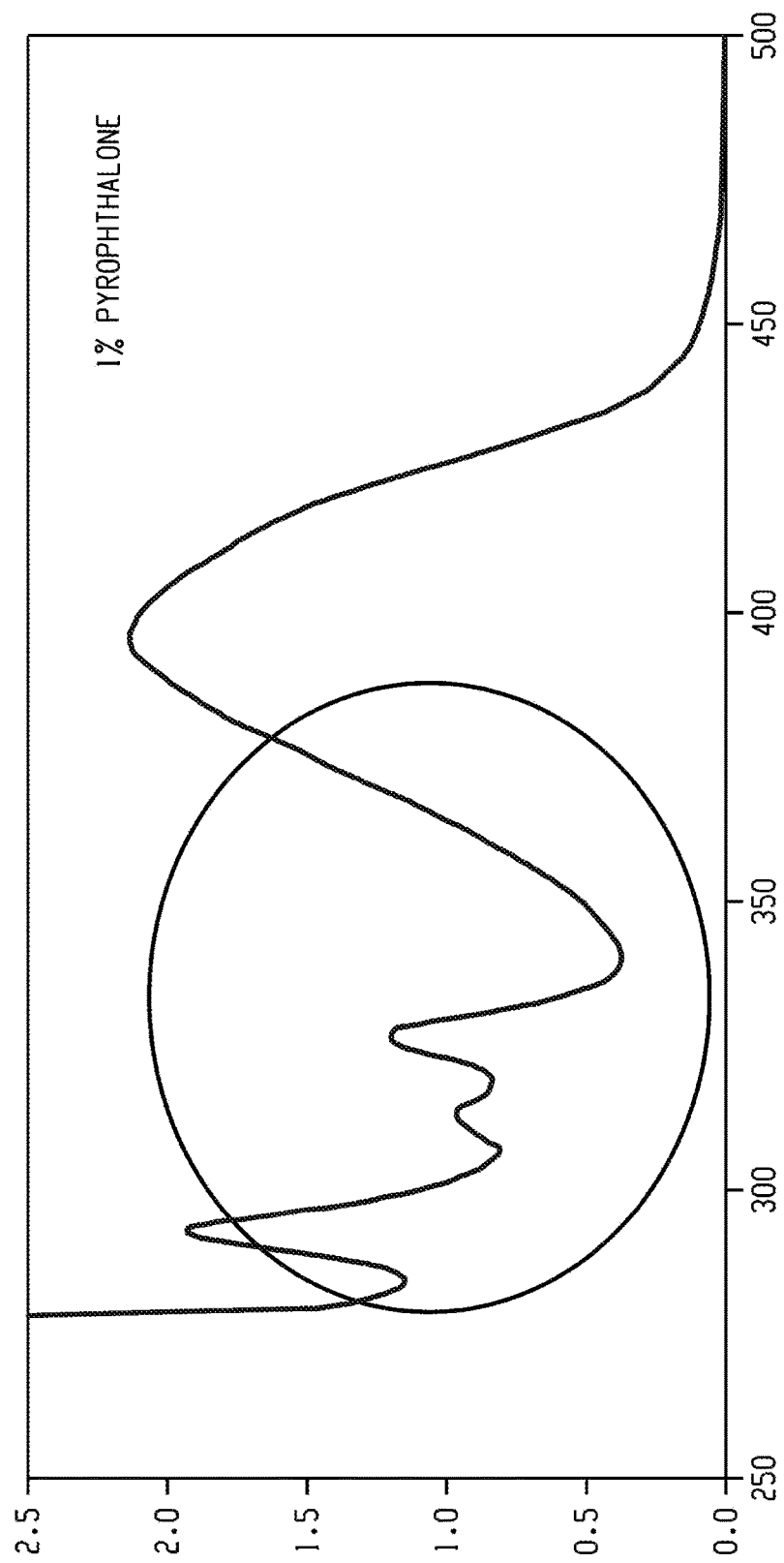
Figure 1C:
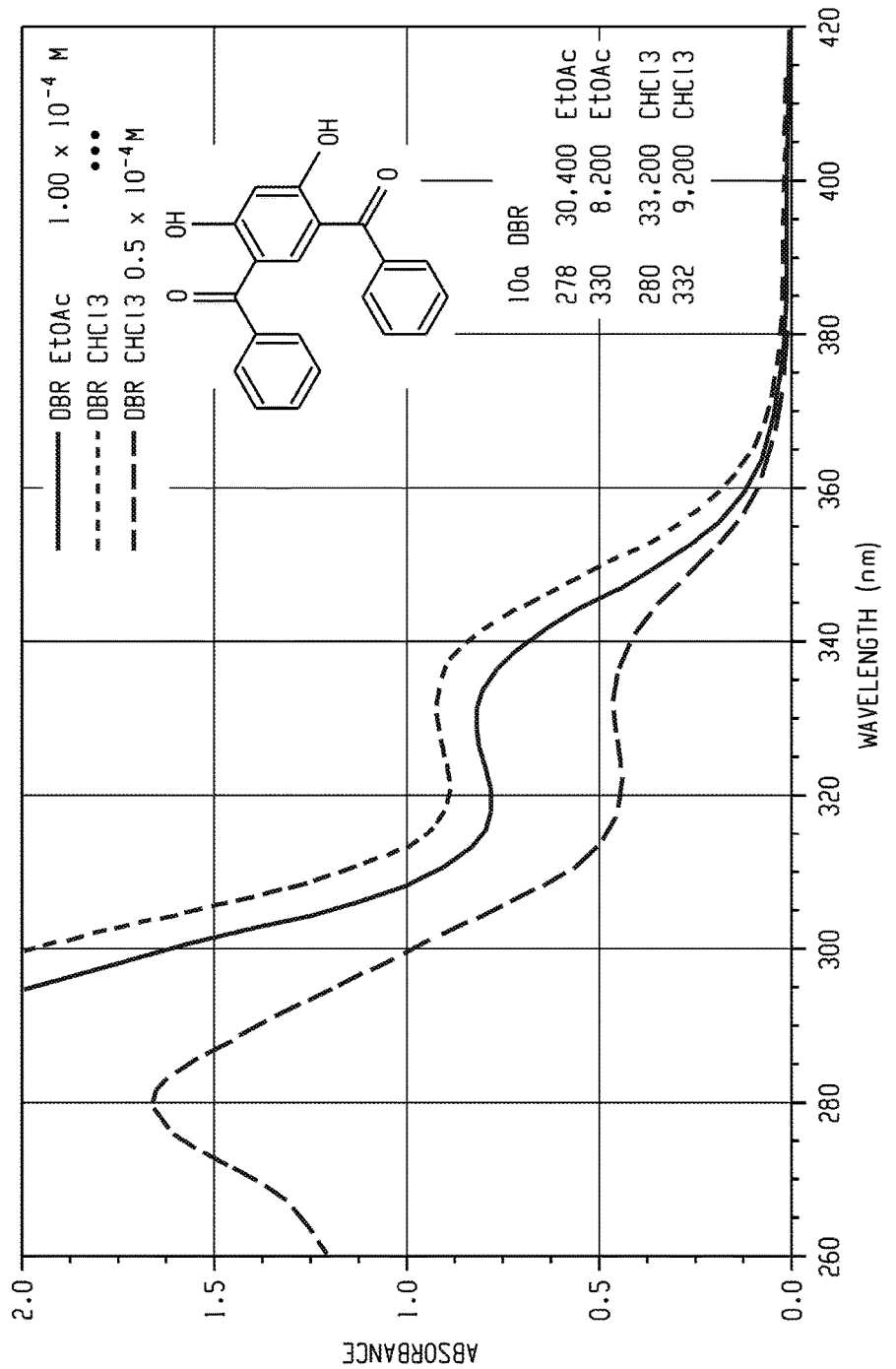

Measurements were made to determine the color shift of the varying compositions, and to establish a relationship between optimal dye loading and article thickness. FIG. 1 shows a comparison of the UV absorption spectra of Cyasorb 5411 (a known UV stabilizer), dibenzoyl resorcinol (DBR), and pyrophthalone. FIG. 1 shows Cyasorb 5411 has reduced absorption of 350-400 nanometers (nm), DBR has a peak absorption from 250-280 nm, and pyrophthalone has an absorbance maximum of 350-400 nm. From FIG. 1, it is noted that pyrophthalone can further contribute to the compositions in that it can supplement a UV stabilizer, absorbing in a range not covered by the conventional UV stabilizer Cyasorb 5411. Thus, the combination of Cyasorb 5411 and pyrophthalone in a polyaryl ester composition can effectively control polymer degradation. Furthermore, pyrophthalone shows fading behavior from 400-450 nm, and can serve to counter-act the photoyellowing of polyaryl esters.

Examples 1-14. Weathering Performance

The following examples demonstrate the weathering performance and synergistic effect of conventional UV stabilizers and pyrophthalone dyes. Chips comprising the polyaryl ester, a polycarbonate polymer, a pyrophthalone, and a UV stabilizer were prepared according to the above-described method. The chips were subjected to weathering conditions in a weatherometer according to the ASTM G155-05a with the test protocol set forth in Table 3.

TABLE 3

| Light Cycle setting: | |
| --- | --- |
| Segment 1: 102 Minutes | |
| Black Panel Temperature | 63° C. |
| Chamber Temperature | 42° C. |
| Relative Humidity | 50% |
| Irradiance at 340 nm | 0.35 W/sq. m |
| Specimen Spray | No |
| Rack Spray | No |
| Segment 2: 18 Minutes | |
| Black Panel Temperature | 63° C. |
| Chamber Temperature | 42° C. |
| Relative Humidity | 50% |
| Irradiance at 340 nm | 0.35 W/sq. m |
| Specimen Spray | Yes |
| Rack Spray | No |
| Xenon Lamp Filters: | |
| Inner Filter | S. Boro |
| Outer Filter | S. Boro |

Figure 2:
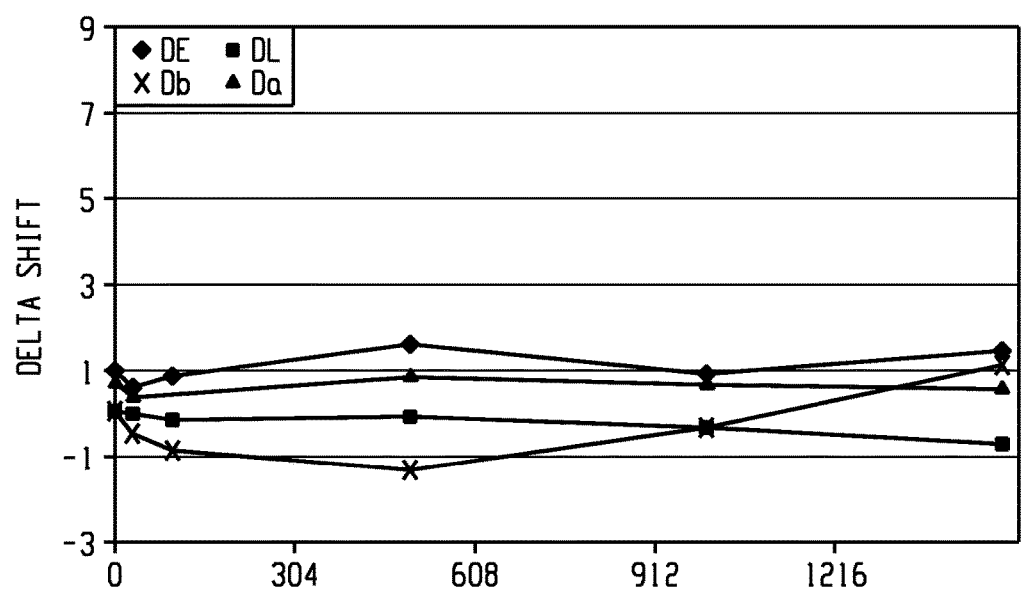
FIG. 2 shows accelerated weathering performance of pyrophthalone dye and Cyasorb 5411 in polycarbonate chips.

The compositions used to prepare the chips for testing are set forth in Table 4. Amounts are in parts per hundred. The chips were periodically removed from the weatherometer to assess their performance in the UV/visible region at regular intervals. Exemplary accelerated weathering performance data is provided in FIG. 2.

Figure 3A:
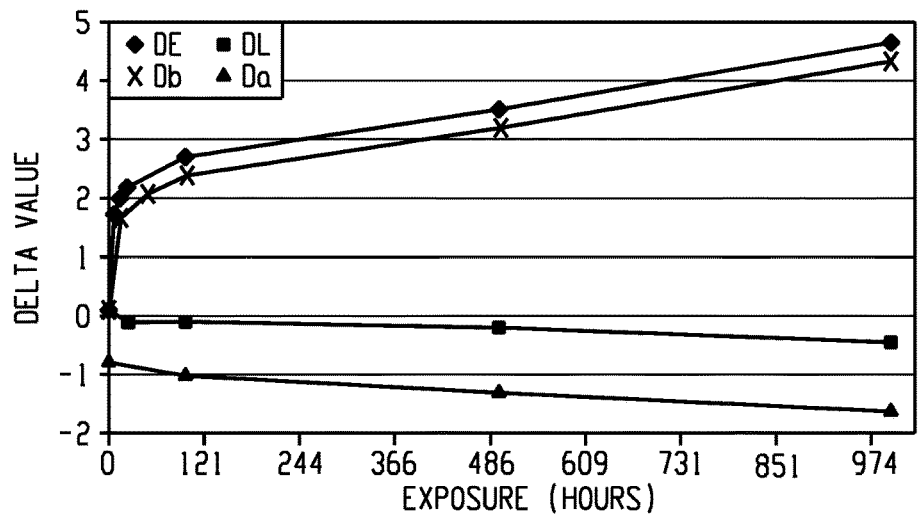
FIGS. 3A-C shows a comparison of color shift in various polymer compositions.
Figure 3B:
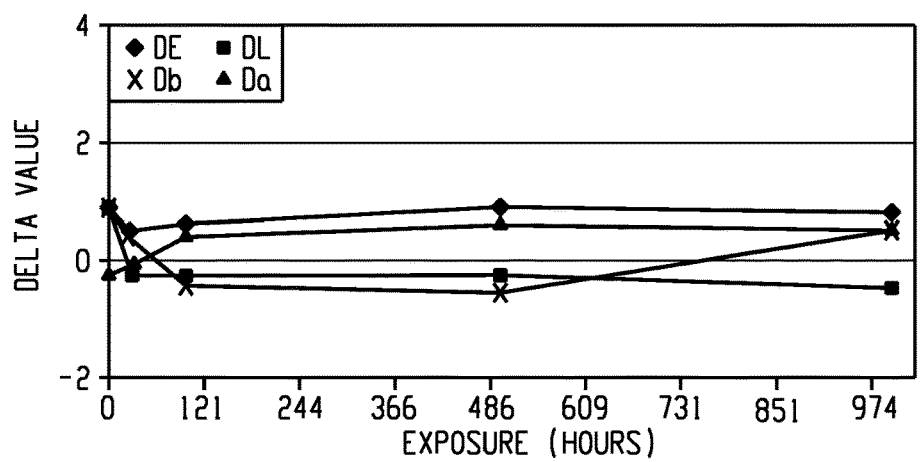
Figure 3C:
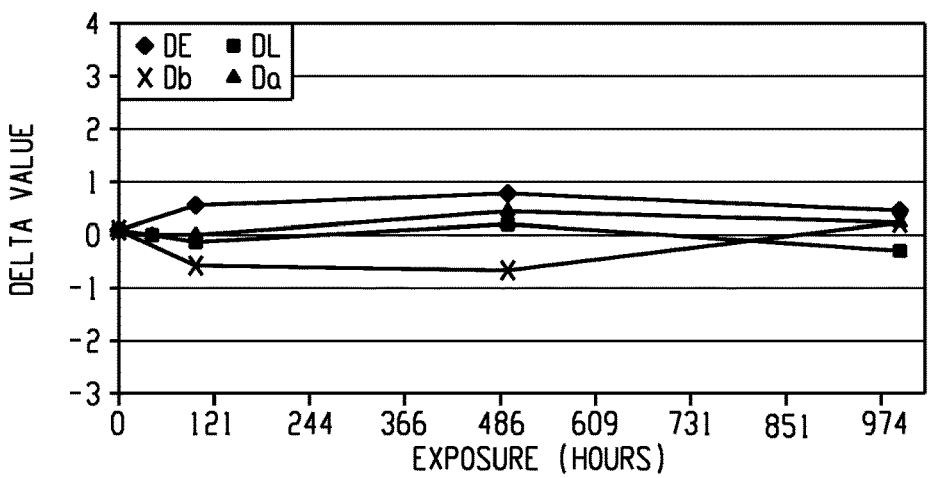

The thermoplastic composition prepared according to example 1 is a comparative composition comprising a blend of polyaryl ester and a polycarbonate. The thermoplastic compositions prepared according to examples 2-7 are exemplary compositions comprising blends of a polyaryl ester, a polycarbonate, and a phthalone, specifically, an ITR-PC polyaryl ester copolymer, bisphenol A polycarbonate, and pyrophthalone. The thermoplastic compositions prepared according to examples 8-14 are exemplary compositions comprising polyaryl ester, a polycarbonate, a pyrophthalone, and a UV stabilizer, specifically, Cyasorb 5411. Surprisingly, examples 7 and 10 both showed a similarly enhanced performance in color measurements following accelerated weathering compared to the composition of example 1, which lacks both a UV stabilizer and a pyrophthalone. A graphical comparison of the color shift of examples 1, 7, and 10 is provided in FIG. 3.

The weathered examples were characterized by percent transmission and haze, and the results obtained for three representative examples are provided in Table 5.

TABLE 5

| | Percent Transmission | | Haze | |
| --- | --- | --- | --- | --- |
| Example | time = 0 hours | time = 1000 hours | time = 0 hours | time = 1000 hours |
| 1 | 92.50 | 91.43 | 0.56 | 1.20 |
| 7 | 92.50 | 91.55 | 0.46 | 1.18 |
| 10 | 92.33 | 91.50 | 0.60 | 1.28 |

No major differences were noted for examples 7 and 10. The results obtained from the accelerated weathering study indicate compositions comprising a polyaryl ether polymer, a polycarbonate, and a pyrophthalone perform well under these conditions, specifically in terms of the color shift of the samples. Furthermore, while the use of a phthalone compound has been shown to act as a UV absorber and a color compensator, the data further suggests including a UV stabilizer in the composition imparts an added advantage.

Examples 15-21. Determining the Relationship Between Sample Thickness and Optimum Phthalone Loading The optimum required loading of a photo-fading dye, such as a phthalone, to a thermoplastic composition to compensate for photoyellowing is dependent upon the thickness of the article. To study the correlation of phthalone content and color change with respect to thickness, articles comprising the compositions of Table 6 were prepared, where amounts are in parts per hundred, the dye is 4-chloropyrophthalone.

TABLE 4

| | 1 | 2 | 3 | 4 | 5 | 6 | 7 | 8 | 9 | 10 | 11 | 12 | 13 | 14 |
| --- | --- | --- | --- | --- | --- | --- | --- | --- | --- | --- | --- | --- | --- | --- |
| ITR-PC | 45.0 | 45.0 | 45.0 | 45.0 | 45.0 | 45.0 | 45.0 | 45.0 | 45.0 | 45.0 | 45.0 | 45.0 | 45.0 | 45.0 |
| PCP1300 | 55.0 | 55.0 | 55.0 | 55.0 | 55.0 | 55.0 | 55.0 | 55.0 | 55.0 | 55.0 | 55.0 | 55.0 | 55.0 | 55.0 |
| KSS | 0.03 | — | — | — | — | — | — | 0.03 | — | — | — | — | — | — |
| PES | 0.30 | 0.3 | 0.3 | 0.3 | 0.3 | 0.3 | 0.3 | 0.30 | 0.3 | 0.3 | 0.3 | 0.3 | 0.3 | 0.3 |
| CER | 0.03 | — | — | — | — | — | 0.03 | 0.03 | — | — | — | — | — | 0.03 |
| PAE | 0.06 | 0.1 | 0.1 | 0.1 | 0.1 | 0.1 | 0.06 | 0.06 | 0.1 | 0.1 | 0.1 | 0.1 | 0.1 | 0.06 |
| UV-C | — | — | — | — | — | — | — | 0.20 | 0.20 | 0.199 | 0.199 | 0.20 | 0.20 | 0.20 |
| PPT | 0.00 | 0.040 | 0.060 | 0.080 | 0.100 | 0.120 | 0.140 | 0.00 | 0.040 | 0.060 | 0.080 | 0.100 | 0.120 | 0.140 |

TABLE 6

| Component | 15 | 16 | 17 | 18 | 19 | 20 | 21 |
|---|---|---|---|---|---|---|---|
| ITR-PC | 45.0 | 45.0 | 45.0 | 45.0 | 45.0 | 45.0 | 45.0 |
| PCP100 | 0.00 | 0.00 | 0.00 | 0.00 | 0.00 | 0.00 | 0.00 |
| PCP1300 | 55.0 | 55.0 | 55.0 | 55.0 | 55.0 | 55.0 | 55.0 |
| KSS | 0.03 | 0.0 | 0.0 | 0.0 | 0.0 | 0.0 | 0.0 |
| PES | 0.30 | 0.3 | 0.3 | 0.3 | 0.3 | 0.3 | 0.3 |
| CER | 0.03 | 0.0 | 0.0 | 0.0 | 0.0 | 0.0 | 0.03 |
| PAE | 0.06 | 0.1 | 0.1 | 0.1 | 0.1 | 0.1 | 0.06 |
| UV-C | 0.20 | 0.20 | 0.199 | 0.199 | 0.20 | 0.20 | 0.20 |
| PPT-Cl | 0.00 | 0.040 | 0.060 | 0.080 | 0.100 | 0.120 | 0.140 |

The molded articles comprising the compositions of examples 15-21 were prepared at varying thicknesses, specifically, 1.6, 2.5, and 3.1 millimeters. The samples were exposed to accelerated weathering conditions according to ASTM G155-05a, and the color data was recorded. The color data was analyzed by constructing a plot of Db values against the 4-chloropyrophthalone loading for each of the three thicknesses after 1000 hours of weathering. The data is presented in Table 7.

TABLE 7

| Example | 4-chloropyrophthalone (ppm) | Db (1.6 mm) | Db (2.5 mm) | Db (3.1 mm) |
|---|---|---|---|---|
| 15 | 0 | 2.68 | 2.56 | 2.55 |
| 16 | 4 | 1.5 | 0.75 | 0.39 |
| 17 | 6 | 0.88 | −0.12 | −0.76 |
| 18 | 8 | 0.31 | −1.07 | −1.71 |
| 19 | 10 | −0.29 | −1.8 | −2.73 |
| 20 | 12 | −0.47 | −1.99 | −3.02 |
| 21 | 14 | −1.39 | −3.41 | −4.53 |

Figure 4:
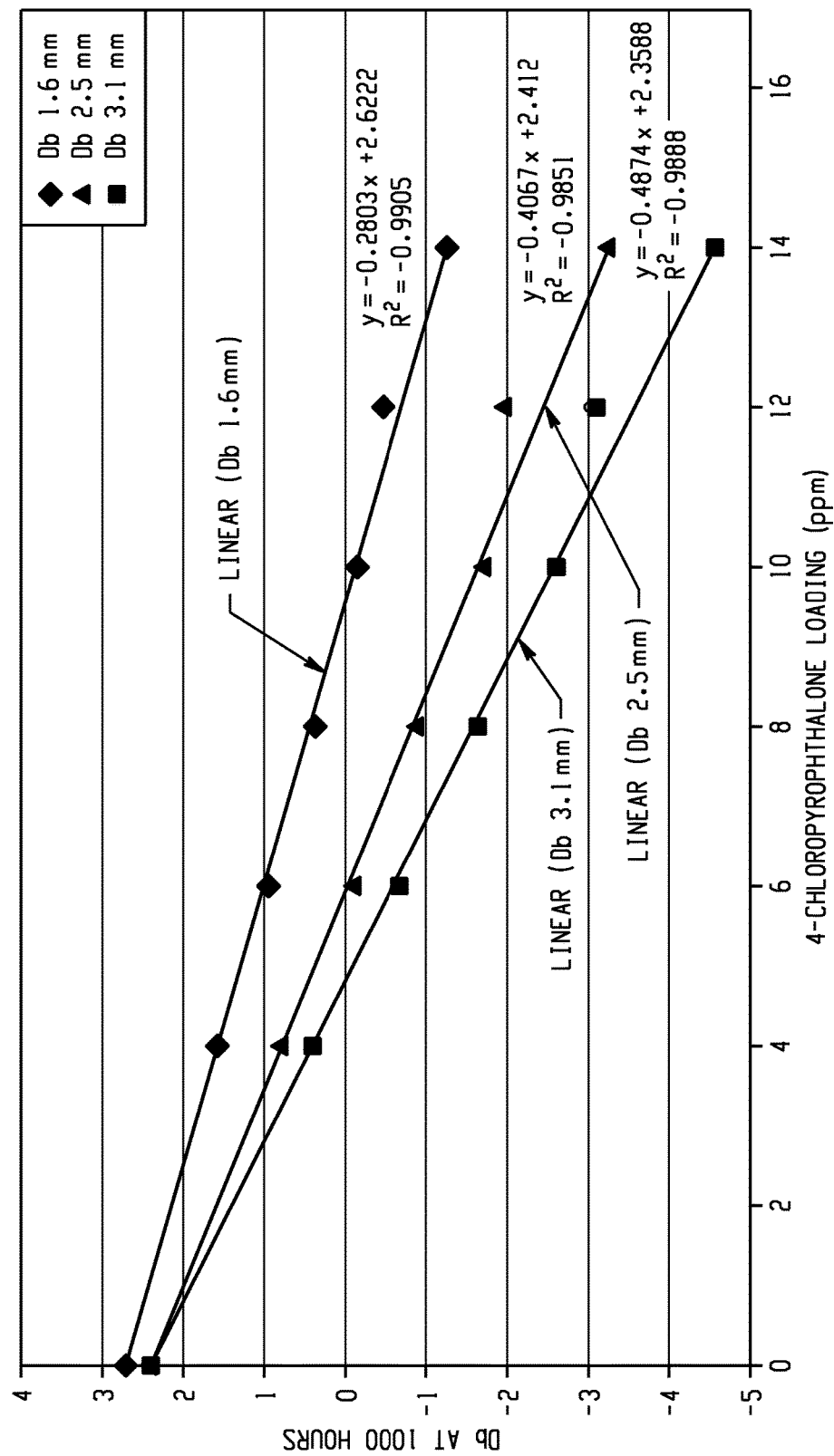
FIG. 4 shows a correlation of Db and 4-chloropyrophthalone loading for samples having a thickness of 1.6, 2.5, or 3.1 mm.

A graphical representation of this data as Db at 1000 hours plotted against 4-chloropyrophthalone loading in ppm is presented as FIG. 4. FIG. 4 shows a good linear correlation between Db at 1000 hours and the loading of 4-chloropyrophthalone. The linear relationship of Db and dye loading could be derived from the plots of FIG. 4. The theoretical value of phthalone loading which would give a Db of zero for each thickness could be calculated. Essentially, the loading of pyrophthalone that would provide an article of a specific thickness with a color change that is substantially zero can be calculated.

Figure 5:
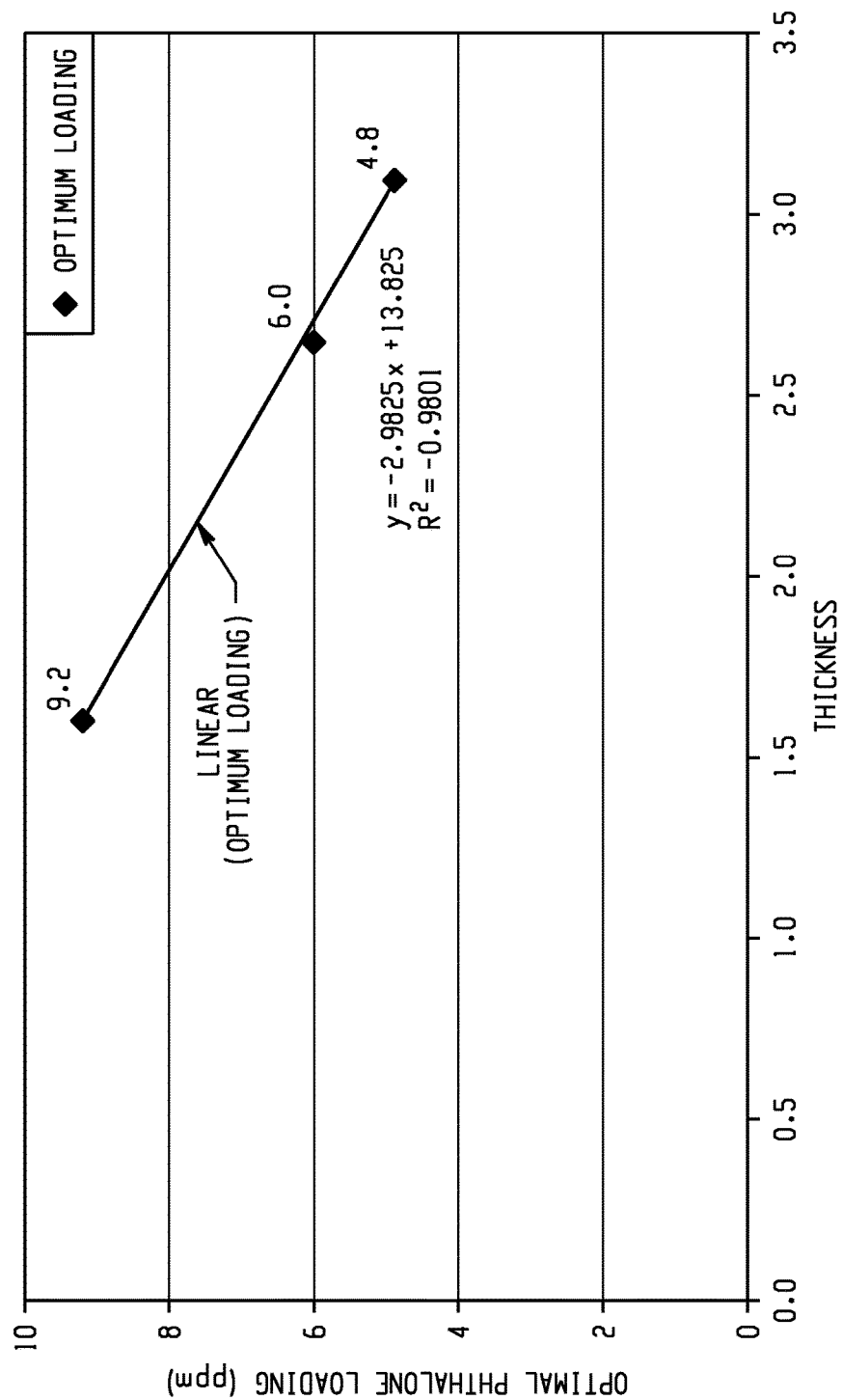
FIG. 5 shows a correlation of article thickness and optimal phthalone loading to achieve substantially no color change.

The calculated values of pyrophthalone loading could further be plotted against the thickness of the samples, which resulted in a linear fit, as shown in FIG. 5. The plot provided as FIG. 5 predicts phthalone loading required such that a given article having a certain thickness shows no substantial change in Db, and accordingly, no substantial color change. The optimum phthalone loading determined for articles having thicknesses of 1.6, 2.5, and 3.1 millimeters (mm) to achieve substantially no color change is provided in Table 8.

TABLE 8

| Article Thickness (mm) | Optimum phthalone loading (ppm) |
|---|---|
| 1.6 | 9.2 |
| 2.5 | 6 |
| 3.1 | 4.8 |

Figure 6A:
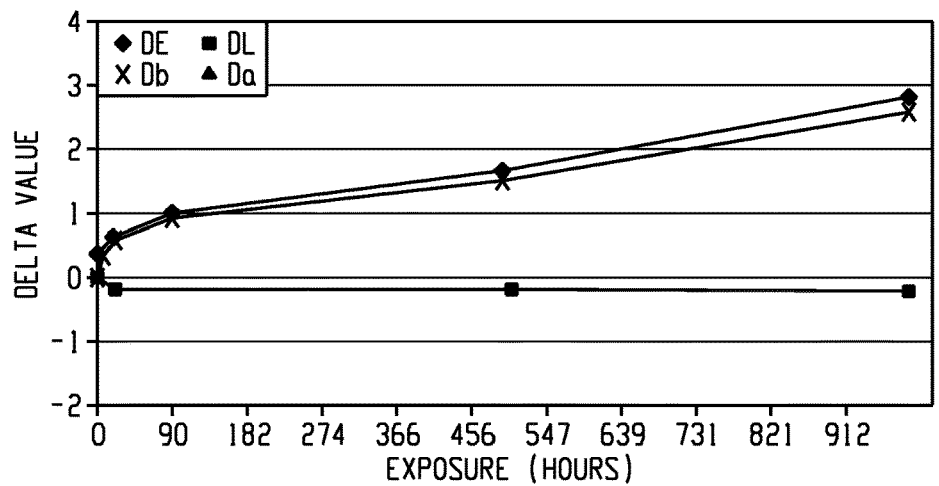
FIGS. 6A-F show color change versus exposure time for articles of varying thickness.
Figure 6B:
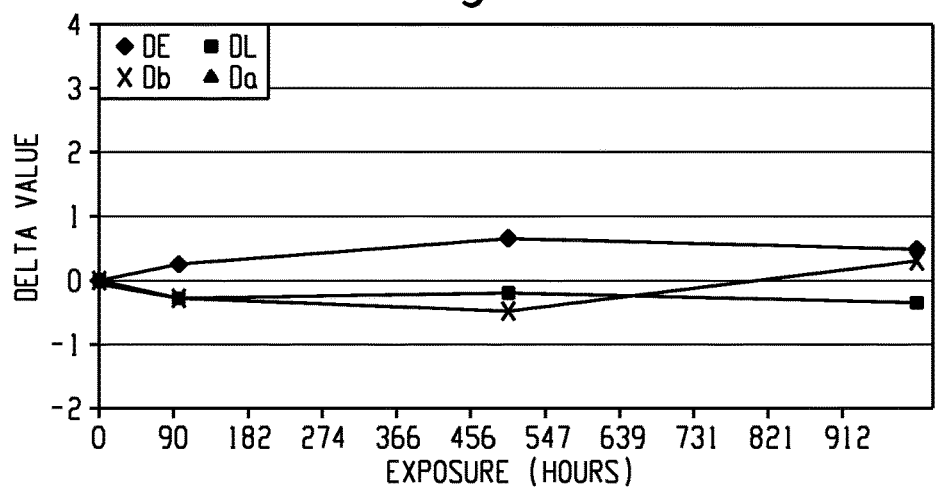
Figure 6C:
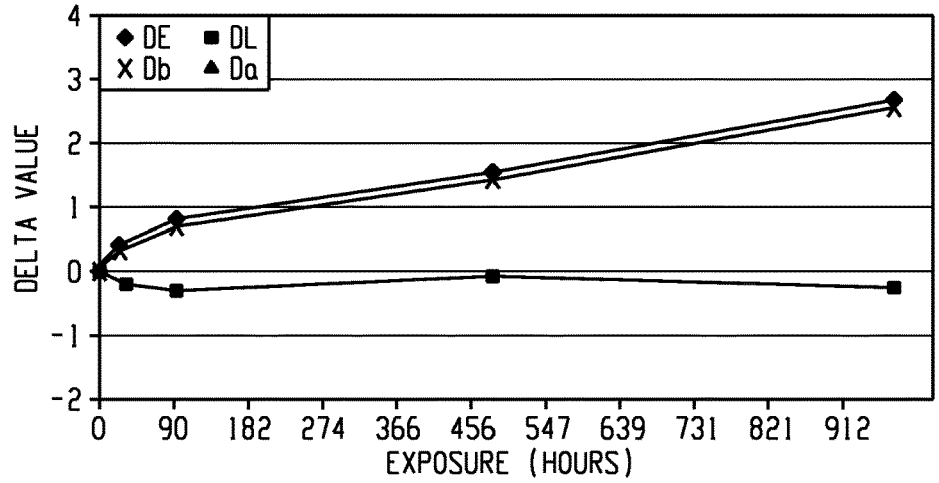
Figure 6D:
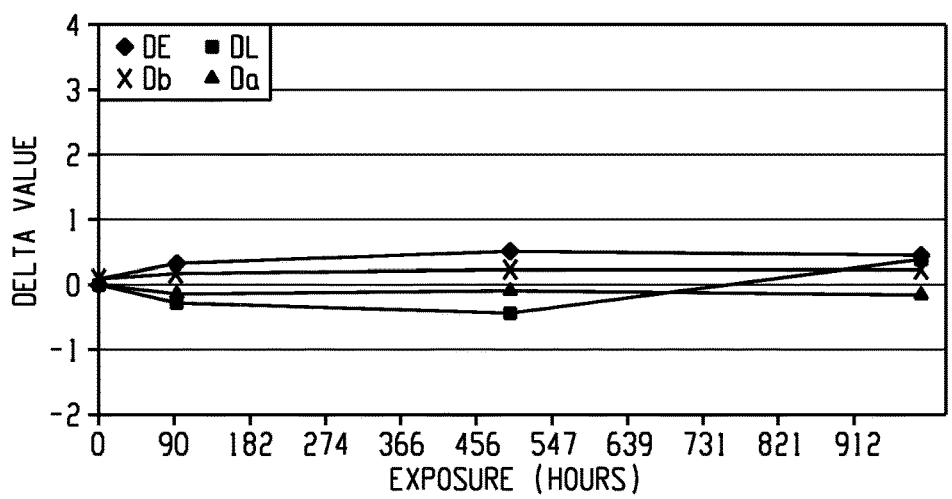
Figure 6E:
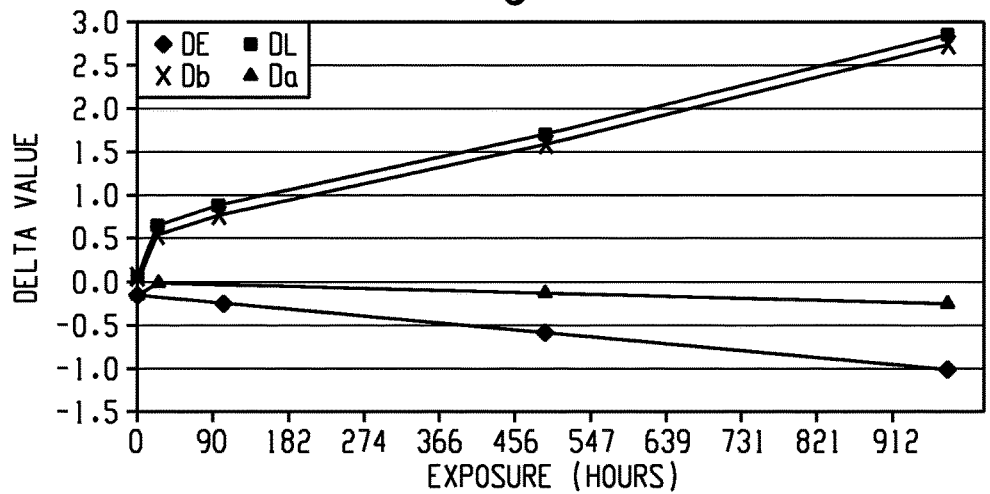
Figure 6F:
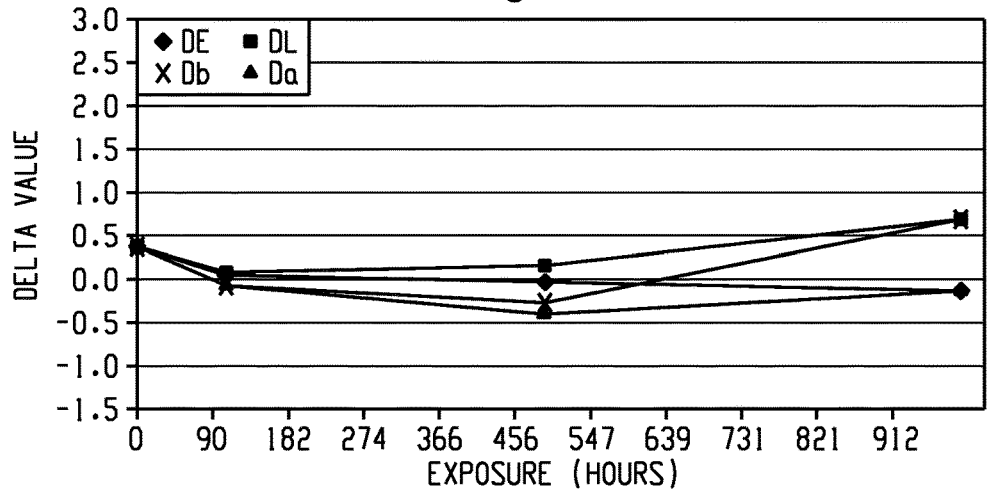
Figure 7A:
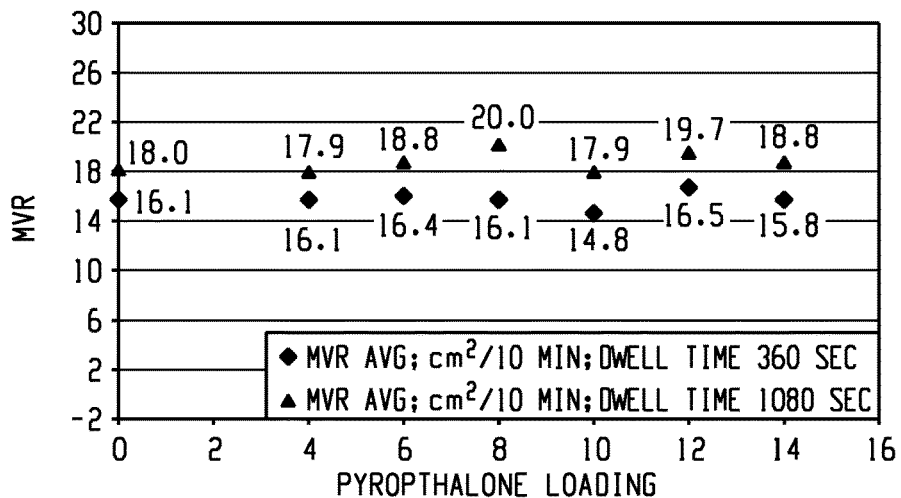
FIGS. 7A-C show melt velocity-flow rate for compositions varying amounts of compounds, where
Figure 7B:
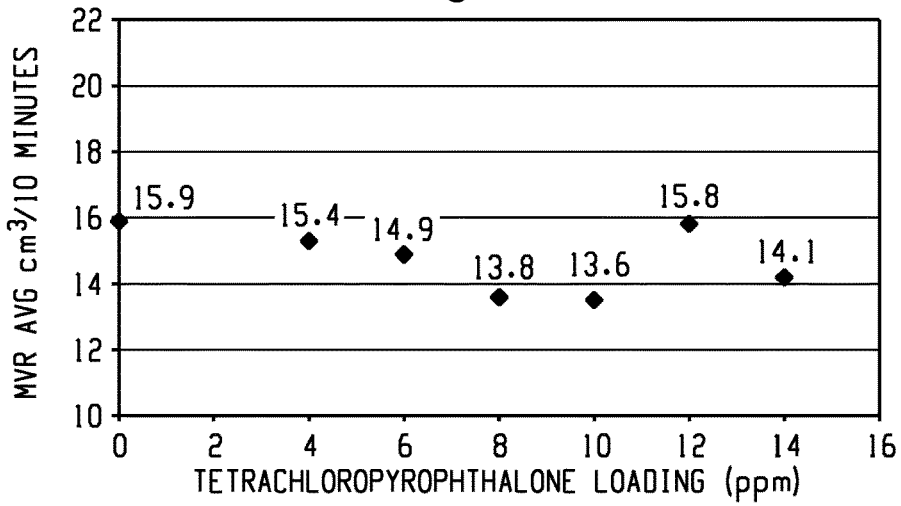
Figure 7C:
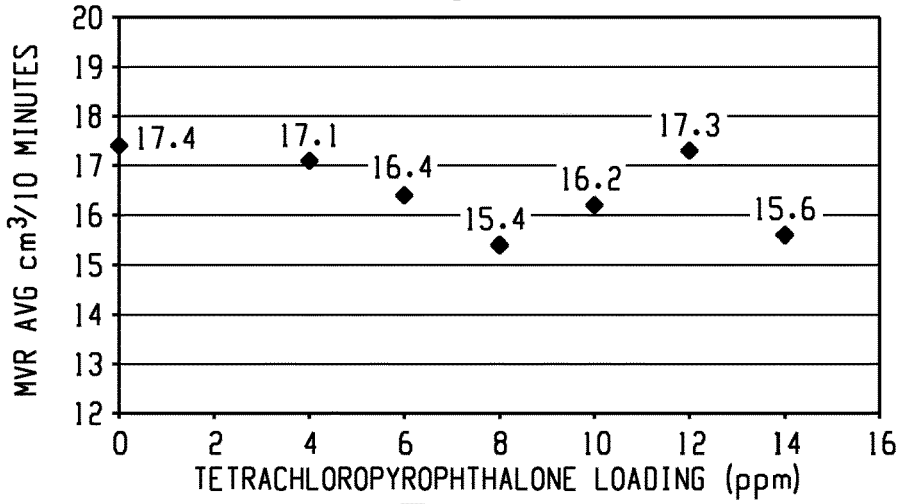
Figure 7D:
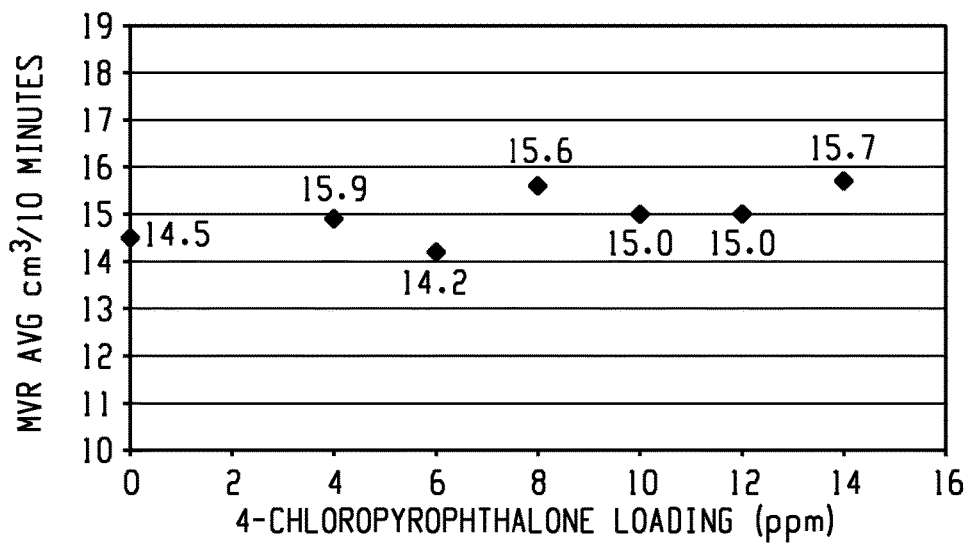
FIG. 7D shows 4-chloropyrophthalone at 360 s dwell time.
Figure 7E:
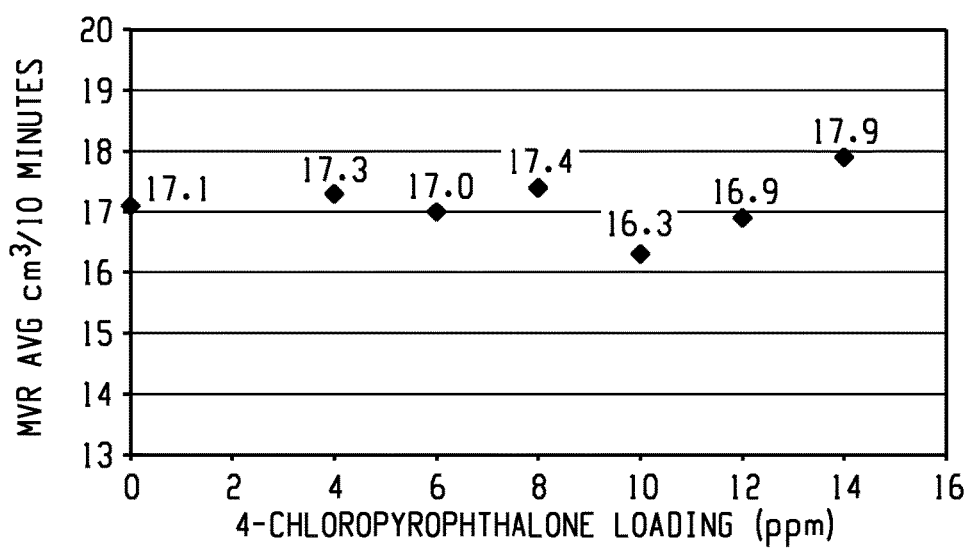
FIG. 7E shows 4-chloropyrophthalone at 1080 s dwell time.

A comparison of the color values was carried out and the graphical results are shown as FIG. 6A-F. The color values were assessed after a certain interval of accelerated UV exposure, and molded chips containing 4-chloropyrophthalone were compared to chips not containing 4-chloropyrophthalone. FIGS. 6A, 6C, and 6E show color change in samples prepared without 4-chloropyrophthalone at thicknesses of 1.6, 3.1, and 2.5 millimeters, respectively. FIGS. 6B, 6D, and 6F show color change in samples prepared with 4-chloropyrophthalone at thicknesses of 1.6, 3.1, and 2.5 millimeters, respectively. At each of the thicknesses tested, chips containing 4-chloropyrophthalone showed minimal color shift over time compared to those lacking the phthalone component.

Thus, useful phthalone dyes have certain attributes including the ability to counteract photoyellowing of other components in the composition, have a photo-fading rate similar to the photoyellowing rate of the polyaryl ester composition, have a stability such that the dye remains intact in the composition during processing without volatilization or degradation, and be inert so that physical properties of the composition, such as melt stability, are not adversely affected.

Melt volume-flow rate (MVR) testing of the compositions was conducted according to ASTM D1238 at a temperature of 300° C., a load of 1.2 kg, and a dwell time of 360 and 1080 seconds. Compositions containing pyrophthalone, 4-chloropyrophthalone, and tetrachloropyrophthalone were tested, and no major deviations in MVR were observed for various phthalone loadings. The results of the MVR testing are shown in FIG. 7.

Figure 8A:
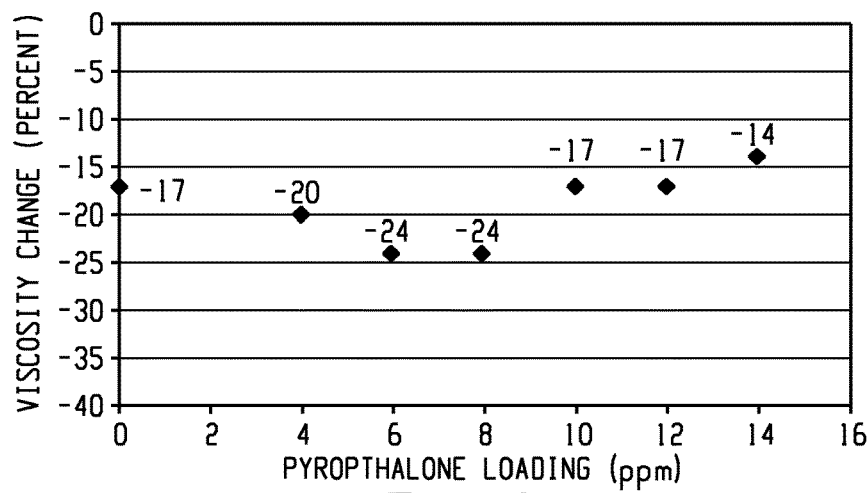
FIGS. 8A-C show percent viscosity change versus compound loading where
Figure 8B:
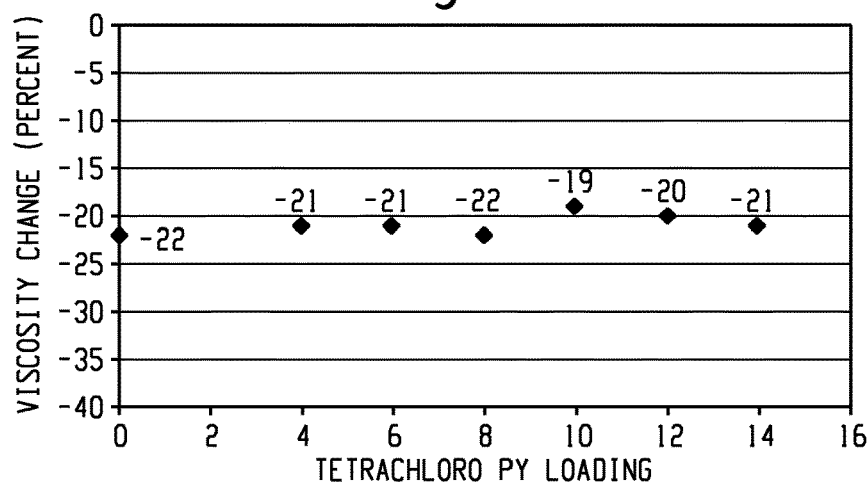
Figure 8C:
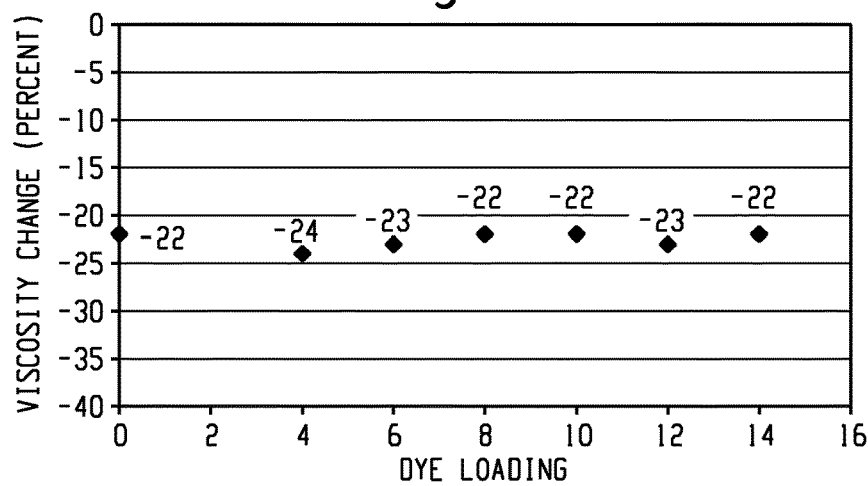

Thermoplastic compositions comprising various loadings of pyrophthalone, 4-chloropyrophthalone, and tetrachloropyrophthalone were further characterized using melt state rheology to determine the change in viscosity, relative to the reference compositions lacking any phthalone component. In general, no significant viscosity changes were seen, as shown in FIG. 8.

The weatherable thermoplastic compositions, articles, and methods are further illustrated by the following embodiments, which are non-limiting.

Embodiment 1

A thermoplastic composition comprising a polyaryl ester; a polymer different from the polyaryl ester; and a phthalone compound according to the formula (16) wherein $Z_1$ represents the atoms necessary to complete a 9- to 13-membered single or fused aromatic ring structure; $Z_2$ represents the atoms necessary to complete a pyridine or quinoline ring; each $R_1$ and each $R_2$ are independently halogen, an alkyl group, an aryl group, a heterocyclic group, an alkoxy group, an aryloxy group, an aromatic or aliphatic thioether group, an aromatic or aliphatic carboxylic acid ester group, or an aromatic or aliphatic amide group; a is 0 to 6; b is 0 to 4; n is 1 or 2; and X is present only if n=2, and is a single bond or a divalent organic radical bonded to the $Z_1$ ring structure through an ether, ketone, or thio linkage.

Embodiment 2

The thermoplastic composition of embodiment 1, wherein the polyaryl ester comprises at least 5 wt %, based on the weight of the polyaryl ester, of repeating units of the formula (1) in which at least 80 percent of the total number of T groups, and/or at least 80 percent of the total J groups contain aromatic moieties and the balance thereof are aliphatic, alicyclic, or aromatic.

Embodiment 3

The thermoplastic composition of embodiment 1 or 2, wherein the polyaryl ester is a copolymer of a polyaryl ester derived from resorcinol and a mixture of isophthalic acid, halide, or anhydride, terephthalic acid, halide, or anhydride, and a polycarbonate derived from bisphenol A and a carbonate source.

Embodiment 4

The thermoplastic composition of embodiment 1 or 2, wherein the polyaryl ester is a copolymer of a polyaryl ester derived from bisphenol A and a mixture of isophthalic acid, halide, or anhydride, terephthalic acid, halide, or anhydride, and a polycarbonate derived from bisphenol A and a carbonate source.

Embodiment 5

The thermoplastic composition of any one or more of embodiments 1 to 4, wherein at least 80 percent, preferably at least 90 percent, of the total number of T groups containing aromatic moieties are derived from isophthalic acid and/or terephthalic acid.

Embodiment 6

The thermoplastic composition of any one or more of embodiments 1 to 5, wherein at least 90 percent of the total number of T groups contain aromatic moieties derived from isophthalic acid and/or terephthalic acid.

Embodiment 7

The thermoplastic composition of any one or more of embodiments 1 to 6, wherein at least 80 percent of the total number of J groups contain aromatic moieties derived from resorcinol and the balance thereof are aliphatic, alicyclic, or aromatic.

Embodiment 8

The thermoplastic composition of any one or more of embodiments 2 to 6, wherein at least 80 percent of the total number of J groups contain aromatic moieties derived from bisphenol A and the balance thereof are aliphatic, alicyclic, or aromatic.

Embodiment 9

The thermoplastic composition of any one or more of embodiments 1 to 8, wherein all of the repeat units of the polyaryl ester are represented by the formula (1) in which at least 90 percent of the total number of T groups, at least 90 percent of the total J groups contain aromatic moieties and the balance thereof are aliphatic, alicyclic, or aromatic.

Embodiment 10

The thermoplastic composition of embodiment 9, wherein at least 90 percent of the total number of T groups contain aromatic moieties derived from isophthalic acid and/or terephthalic acid.

Embodiment 11

The thermoplastic composition of any one or more of embodiments 1 to 10, wherein the polyaryl ester comprises from 5 wt % to 30 wt % of ester repeat units represented by the formula (1) in which at least 90 percent of the total number of T groups, or at least 90 percent of the total J groups contain aromatic moieties, or both, and the balance thereof are aliphatic, alicyclic, or aromatic; and from 70 wt % to 95 wt % of carbonate repeat units represented by the formula (4) in which at least 60 percent of the total number of $R^1$ groups contain aromatic moieties and the balance thereof are aliphatic, alicyclic, or aromatic; wherein the weight percentages are based on the weight of the polymer and with the proviso that the sum of wt % of the ester repeat units and the wt % of the carbonate repeat units is 100.

Embodiment 12

The thermoplastic composition of embodiment 11, wherein at least 90 percent of the total number of T groups contain aromatic moieties derived from isophthalic acid and/or terephthalic acid.

Embodiment 13

The thermoplastic composition of embodiments 11 or 12, wherein all of the $R^1$ groups contain aromatic moieties.

Embodiment 14

The thermoplastic composition of embodiment 13, wherein all of the $R^1$ groups are derived from bisphenol A and/or resorcinol.

Embodiment 15

The thermoplastic composition of embodiment 11, wherein the T groups are derived from isophthalic acid and/or terephthalic acid, the J groups are derived from resorcinol, and the $R^1$ groups are derived from bisphenol A, resorcinol, or a combination comprising at least one of the foregoing.

Embodiment 16

The thermoplastic composition of any one or more of embodiments 1 to 15, wherein the polymer different from the polyaryl ester is a polycarbonate, preferably a bisphenol A-polycarbonate.

Embodiment 17

The thermoplastic composition of any one or more of embodiments 1 to 16, wherein the phthalone compound is according to the formula (16a) wherein $R_{1.1}$, $R_{1.2}$, $R_{1.3}$, $R_{1.4}$, $R_{2.1}$, $R_{2.2}$, $R_{2.3}$, and $R_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, n and X are as defined in embodiment 1, and X is present in place of one of $R_{1.1}$, $R_{1.2}$, $R_{1.3}$, or $R_{1.4}$ when n is 2.

Embodiment 18

The thermoplastic composition of any one or more of embodiments 1 to 17, wherein the phthalone compound is according to the formula (16b) wherein $R_{1.1}$, $R_{1.2}$, $R_{1.3}$, $R_{1.4}$, $R_{2.1}$, $R_{2.2}$, $R_{2.3}$, and $R_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group.

Embodiment 19

The thermoplastic composition of any one or more of embodiments 1 to 18, wherein the phthalone compound is according to the formula (16c) wherein $R_{1.1}$, $R_{1.2}$, $R_{1.3}$, $R_{1.4}$, $R_{1.5}$, $R_{1.6}$, $R_{2.1}$, $R_{2.2}$, $R_{2.3}$, and $R_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, n and X are as defined in embodiment 1, and X is present in place of one of $R_{1.1}$, $R_{1.2}$, $R_{1.3}$, $R_{1.4}$, $R_{1.5}$, or $R_{1.6}$, when n is 2.

Embodiment 20

The thermoplastic composition of any one or more of embodiments 1 to 19, wherein $Z_2$ represents the atoms necessary to complete a quinoline ring or a pyridine ring.

Embodiment 21

The thermoplastic composition of any one or more of embodiments 1 to 20, wherein the phthalone compound is of the formula (16j), (16k), (16l), or a combination comprising at least one of the foregoing.

Embodiment 22

The thermoplastic composition of any one or more of embodiments 1 to 21, comprising 0.0001 wt % to 1 wt %, preferably 0.001 wt % to 0.14 wt %, more preferably 0.01 wt % to 0.1 wt %, most preferably 0.02 wt % to 0.08 wt % of the phthalone compound, each based on the total weight of the thermoplastic compositions.

Embodiment 23

The thermoplastic composition of any one or more of embodiments 1 to 22, wherein the phthalone compound exhibits photobleaching in the region of light from 400-450 nm and the polyaryl ester exhibits photoyellowing in the region of 400-450 nm.

Embodiment 24

The thermoplastic composition of any one or more of embodiments 1 to 23, further comprising a blue colorant.

Embodiment 25

The thermoplastic composition of any one or more of embodiments 1 to 24, further comprising a UV stabilizer.

Embodiment 26

The thermoplastic composition of any one or more of embodiments 1 to 25, wherein the phthalone compound has a decomposition onset temperature, of at least 250° C., preferably at least 270° C., as determined according to ASTM E2550-11.

Embodiment 27

The thermoplastic composition of any one or more of embodiments 1 to 25, wherein an opaque color chip comprising the thermoplastic composition has a Delta E color shift of less than 6 after weathering for 1000 hours according to ASTM G155-05a.

Embodiment 28

The thermoplastic composition of any one or more of embodiments 1 to 27, wherein an opaque color chip comprising the thermoplastic composition has a Delta E color shift of less than 2 after weathering for 1000 hours according to ASTM G155-05a.

Embodiment 29

The thermoplastic composition of any one or more of embodiments 1 to 28, wherein the composition is free of dyes with thermal stability less than 270° C. and/or UV-VIS absorption more than 450 nm and that exhibit photobleaching in the region of light from 400 to 450 nm.

Embodiment 30

The thermoplastic composition of any one or more of embodiments 1 to 29, further comprising an impact modifier.

Embodiment 31

The thermoplastic composition of any one or more of embodiments 1 to 30, wherein the composition further comprises fillers, reinforcing agents, antioxidants, heat stabilizers, light stabilizers, plasticizers, lubricants, mold release agents, antistatic agents, epoxides, colorants, carbon black, organic dyes, surface effect additives, radiation stabilizers, flame retardants, anti-drip agents, or a combination comprising at least one of the foregoing.

Embodiment 32

An article comprising the thermoplastic composition of any one or more of embodiments 1 to 31.

Embodiment 33

The article of embodiment 32, wherein the article is an electronic display window, an illuminant lens or cover, or an automotive component.

Embodiment 34

The article of embodiment 32, wherein the article is a component, a fender, a grille, an applique, a visor and/or a trim part for agricultural tractors or equipment, industrial or construction equipment, recreational vehicles, golf carts, all-terrain vehicles, marine ships, watercrafts, and lawn care equipment.

Embodiment 35

The article of embodiment 32, wherein the article is a component, a fender, a grille, an applique, a visor and/or a trim part for an automotive vehicle or truck, or a component of a marine buoy.

Embodiment 36

The article of embodiment 32, wherein the article is a sheet, a multi-layered sheet, a multi-wall sheet, a multi-layered-multiwall sheet, or a combination comprising at least one of the foregoing.

Embodiment 37

The article of any one or more of embodiments 32 to 36, wherein the article comprises a polymer coating disposed on the surface of the article, the polymer coating comprising the thermoplastic composition of any one or more of embodiments 1 to 31 to protect said article from weathering effects.

Embodiment 38

A method of making an article comprising the thermoplastic composition of any one or more of embodiments 1 to 31, the method comprising heating the composition to a melt temperature of at least 250° C., and extruding or molding the article.

Embodiment 39

The method of embodiment 38, wherein the melt temperature is at least 280° C., preferably at least 290° C.

Embodiment 40

An article prepared by the method of any one or more of embodiments 38 or 39.

Embodiment 41

A polymer coating disposed on the surface of an article, wherein the polymer coating comprises the thermoplastic composition of any one or more of embodiments 1 to 31 to protect said article from weathering effects.

In general, the compositions, methods, and articles can alternatively comprise, consist of, or consist essentially of, any appropriate components herein disclosed. The compositions can additionally, or alternatively, be formulated so as to be devoid, or substantially free, of any components, materials, ingredients, adjuvants or species used in the prior art compositions or that are otherwise not necessary to the achievement of the function and/or objectives of the present compositions and articles.

As used herein, the terms "a," "an," and "the" do not denote a limitation of quantity, and are to be construed to cover both the singular and the plural, unless otherwise indicated herein or clearly contradicted by context. "Or" means "and/or" unless clearly indicated otherwise. The modifier "about" used in connection with a quantity is inclusive of the stated value and has the meaning dictated by the context (e.g., includes the degree of error associated with measurement of the particular quantity). All ranges disclosed herein are inclusive of the endpoints, and the endpoints are independently combinable with each other. The suffix "(s)" is intended to include both the singular and the plural of the term that it modifies, thereby including at least one of that term. "Optional" or "optionally" means that the subsequently described event or circumstance can or cannot occur, and that the description includes instances where the event occurs and instances where it does not. "Combination" is inclusive of blends, mixtures, alloys, reaction products, and the like. Furthermore, the terms "first," "second," and the like, herein do not denote any order, quantity, or importance, but rather are used to distinguish one element from another. It is to be understood that the described elements may be combined in any suitable manner in the various embodiments.

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene (—CH$_2$—) or propylene (—(CH$_2$)$_3$—)). "Alkenyl" and "alkenylene" mean a monovalent or divalent, respectively, straight or branched chain hydrocarbon group having at least one carbon-carbon double bond (e.g., ethenyl (—HC=CH$_2$) or propenylene (—HC(CH$_3$)=CH$_2$—). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula —C$_n$H$_{2n-x}$ and —C$_n$H$_{2n-2x}$— wherein x is the number of cyclization. "Aryl" means a monovalent, monocyclic, or polycyclic aromatic group (e.g., phenyl or naphthyl). "Arylene" means a divalent, monocyclic, or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

"Substituted" means that the compound or group is substituted with at least one (e.g., 1, 2, 3, or 4) substituents instead of hydrogen, where each substituent is independently nitro (—NO$_2$), cyano (—CN), hydroxy (—OH), halogen, thiol (—SH), thiocyano (—SCN), C$_{1-6}$ alkyl, C$_{2-6}$ alkenyl, C$_{2-6}$ alkynyl, C$_{1-6}$ haloalkyl, C$_{1-9}$ alkoxy, C$_{1-6}$ haloalkoxy, C$_{3-12}$ cycloalkyl, C$_{5-18}$ cycloalkenyl, C$_{6-12}$ aryl, C$_{7-13}$ arylalkylene (e.g, benzyl), C$_{7-12}$ alkylarylene (e.g, toluyl), C$_{4-12}$ heterocycloalkyl, C$_{3-12}$ heteroaryl, C$_{1-6}$ alkyl sulfonyl (—S(=O)$_2$-alkyl), C$_{6-12}$ arylsulfonyl (—S(=O)$_2$-aryl), or tosyl (CH$_3$C$_6$H$_4$SO$_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituents. All references are incorporated herein by reference.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications, variations, improvements, and substantial equivalents.

The invention claimed is:

1. An article comprising a thermoplastic composition, the thermoplastic composition comprising
a polyaryl ester;
a polymer different from the polyaryl ester; and
a phthalone compound according to the formula:

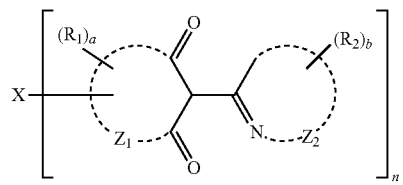

wherein
- $Z_1$ represents the atoms necessary to complete a 9- to 13-membered single or fused aromatic ring structure,
- $Z_2$ represents the atoms necessary to complete a pyridine or quinoline ring, each $R_1$ and each $R_2$ are independently halogen, an alkyl group, an aryl group, a heterocyclic group, an alkoxy group, an aryloxy group, an aromatic or aliphatic thioether group, an aromatic or aliphatic carboxylic acid ester group, or an aromatic or aliphatic amide group,
- a is 0 to 6, b is 0 to 4, n is 1 or 2, and
- X is present only if n=2, and is a single bond or a divalent organic radical bonded to the $Z_1$ ring structure through an ether, ketone, or thio linkage;

wherein
- the phthalone compound is present in an amount of 0.001 to 0.1 weight percent based on the total weight of the thermoplastic composition when the article has a thickness of 0.035 to 0.49 millimeters; and
- the phthalone compound is present in an amount of 0.0001 to 0.01 weight percent based on the total weight of the thermoplastic composition when the article has a thickness of 0.5 to 3 millimeters.

2. The article of claim 1, wherein the polyaryl ester comprises at least 5 wt %, based on the weight of the polyaryl ester, of repeating units of the formula

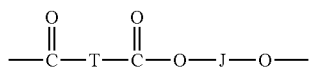

in which at least 80 percent of the total number of T groups, and/or at least 80 percent of the total J groups contain aromatic moieties and the balance thereof are aliphatic, alicyclic, or aromatic.

3. The article of claim 1, wherein the polyaryl ester is a copolymer of a polyaryl ester derived from resorcinol or bisphenol A and a mixture of isophthalic acid, halide, or anhydride, terephthalic acid, halide, or anhydride, and a polycarbonate derived from bisphenol A and a carbonate source.

4. The article of claim 2,
- wherein at least 80 percent of the total number of T groups containing aromatic moieties are derived from isophthalic acid and/or terephthalic acid; and
- at least 80 percent of the total number of J groups contain aromatic moieties derived from resorcinol or bisphenol A and the balance thereof are aliphatic, alicyclic, or aromatic.

5. The article of claim 1, wherein the polyaryl ester comprises:
- from 5 wt % to 30 wt % of ester repeat units represented by the formula:

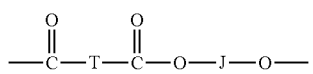

in which at least 90 percent of the total number of T groups, and/or at least 90 percent of the total J groups contain aromatic moieties and the balance thereof are aliphatic, alicyclic, or aromatic; and
- from 70 wt % to 95 wt % of carbonate repeat units represented by the formula:

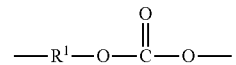

in which at least 60 percent of the total number of $R^1$ groups contain aromatic moieties and the balance thereof are aliphatic, alicyclic, or aromatic;

wherein the weight percentages are based on the weight of the polymer and with the proviso that the sum of wt % of the ester repeat units and the wt % of the carbonate repeat units is 100.

6. The article of claim 5, wherein
- at least 90 percent of the total number of T groups contain aromatic moieties derived from isophthalic acid and/or terephthalic acid; and
- all of the $R^1$ groups contain aromatic moieties, preferably wherein all of the $R^1$ groups are derived from bisphenol A and/or resorcinol.

7. The article of claim 6, wherein the T groups are derived from isophthalic acid and/or terephthalic acid, the J groups are derived from resorcinol, and the $R^1$ groups are derived from bisphenol A, resorcinol, or a combination comprising at least one of the foregoing.

8. The article of claim 1, wherein the polymer different from the polyaryl ester is a polycarbonate.

9. The article of claim 1, wherein the phthalone compound is according to the formula:

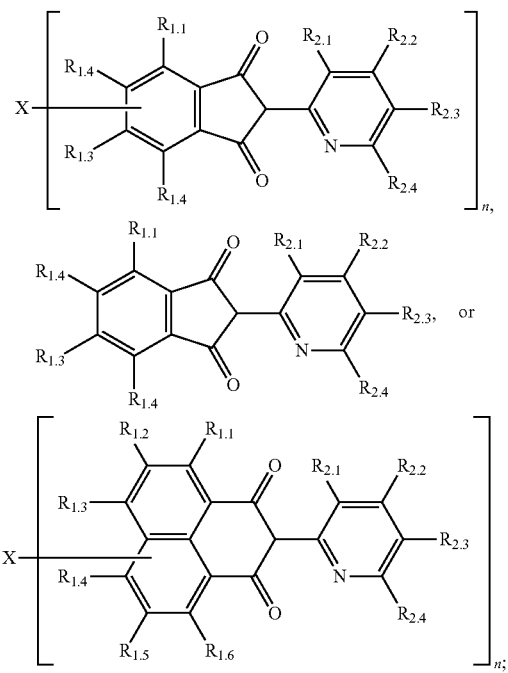

wherein
- $R_{1.1}$, $R_{1.2}$, $R_{1.3}$, $R_{1.4}$, $R_{2.1}$, $R_{2.2}$, $R_{2.3}$, and $R_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group,
- n and X are as defined in claim 1, and
- X is present in place of one of $R_{1.1}$, $R_{1.2}$, $R_{1.3}$, or $R_{1.4}$ when n is 2.

10. The article of claim 1, wherein the phthalone compound is

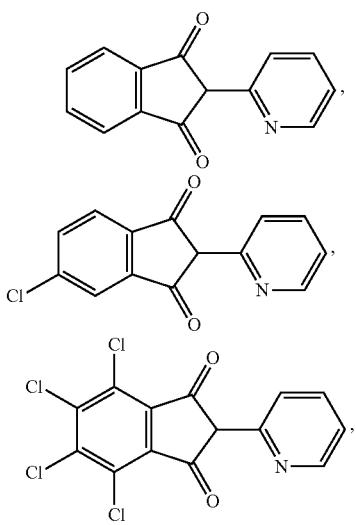

or a combination comprising at least one of the foregoing.

11. The article of claim 1, comprising 0.0001 wt % to 1 wt % of the phthalone compound, based on the total weight of the thermoplastic compositions.

12. The article of claim 1,
wherein the phthalone compound exhibits photobleaching in the region of light from 400-450 nm and the polyaryl ester exhibits photoyellowing in the region of 400-450 nm;
wherein the phthalone compound has a decomposition onset temperature, of at least 250° C., as determined according to ASTM E2550-11; and
wherein an opaque color chip comprising the thermoplastic composition has a Delta E color shift of less than 6, after weathering for 1000 hours according to ASTM G155-05a.

13. The article of claim 1, further comprising a blue colorant, a UV stabilizer, an impact modifier, fillers, reinforcing agents, antioxidants, heat stabilizers, light stabilizers, plasticizers, lubricants, mold release agents, antistatic agents, epoxides, carbon black, organic dyes, surface effect additives, radiation stabilizers, flame retardants, anti-drip agents, or a combination comprising at least one of the foregoing.

14. The article of claim 1, wherein the composition is free of dyes with thermal stability less than 270° C. and/or UV-VIS absorption more than 450 nm and that exhibit photobleaching in the region of light from 400 to 450 nm.

15. The article of claim 1, wherein the article is an electronic display window, an illuminant lens or cover, an automotive component;
a fender, a grille, an applique, a visor and/or a trim part for agricultural tractors or equipment, industrial or construction equipment, recreational vehicles, golf carts, all-terrain vehicles, marine ships, watercrafts, and lawn care equipment;
a component, a fender, a grille, an applique, a visor and/or a trim part for an automotive vehicle or truck, or a component of a marine buoy; or
a sheet, a multi-layered sheet, a multi-wall sheet, a multi-layered-multiwall sheet, or a combination comprising at least one of the foregoing.

16. The article of claim 1, wherein the article comprises a polymer coating disposed on the surface of the article, the polymer coating comprising the thermoplastic composition of claim 1 to protect said article from weathering effects.

17. A method of making the article of claim 1, the method comprising heating the composition to a melt temperature of at least 250° C., and extruding or molding the article.

18. The article of claim 1, wherein
the phthalone compound is present in an amount of 0.01 to 0.05 weight percent based on the total weight of the thermoplastic composition when the article has a thickness of 0.035 to 0.49 millimeters; and
the phthalone compound is present in an amount of 0.0001 to 0.005 weight percent based on the total weight of the thermoplastic composition when the article has a thickness of 0.5 to 3 millimeters.

* * * * *